(12) United States Patent
Adjaoute

(10) Patent No.: US 11,748,758 B2
(45) Date of Patent: Sep. 5, 2023

(54) METHOD FOR IMPROVING OPERATING PROFITS WITH BETTER AUTOMATED DECISION MAKING WITH ARTIFICIAL INTELLIGENCE

(71) Applicant: Brighterion, Inc., Purchase, NY (US)

(72) Inventor: Akli Adjaoute, Mill Valley, CA (US)

(73) Assignee: Brighterion, Inc., Purchase, NY (US)

( * ) Notice: Subject to any disclaimer, the term of this patent is extended or adjusted under 35 U.S.C. 154(b) by 242 days.

(21) Appl. No.: 17/198,473

(22) Filed: Mar. 11, 2021

(65) Prior Publication Data

US 2021/0264433 A1 Aug. 26, 2021

Related U.S. Application Data

(63) Continuation of application No. 16/601,226, filed on Oct. 14, 2019, now Pat. No. 10,977,655, which is a continuation of application No. 14/938,844, filed on Nov. 12, 2015, now abandoned, which is a continuation-in-part of application No. 14/815,848, filed on Jul. 31, 2015, now abandoned, which is a continuation-in-part of application No. 14/514,381, filed on Oct. 15, 2014, now abandoned, said application No. 14/938,844 is a continuation-in-part of application No. 14/815,934, filed on Jul. 31, 2015, now abandoned, and a continuation-in-part of application No. 14/690,380, filed on Apr. 18, 2015, now abandoned, and a continuation-in-part of application No. 14/521,667, filed on Oct. 23, 2014, now abandoned.

(51) Int. Cl.
*G06Q 20/40* (2012.01)
*G06N 20/00* (2019.01)
*G06N 3/042* (2023.01)

(52) U.S. Cl.
CPC ......... *G06Q 20/4016* (2013.01); *G06N 20/00* (2019.01); *G06N 3/042* (2023.01)

(58) Field of Classification Search
CPC ........................................................ G06N 3/08
See application file for complete search history.

(56) References Cited

U.S. PATENT DOCUMENTS

| | | |
|---|---|---|
| 7,159,208 B2 | 1/2007 | Keeley |
| 7,403,922 B1 | 7/2008 | Lewis et al. |
| 7,590,970 B2 | 9/2009 | Bromley |
| 7,630,956 B2 | 12/2009 | Wyatt et al. |
| 7,685,083 B2 | 3/2010 | Fairweather |
| 7,877,421 B2 | 1/2011 | Berger et al. |

(Continued)

OTHER PUBLICATIONS

Office Action from U.S. Appl. No. 16/424,187 (dated Feb. 26, 2021).

(Continued)

*Primary Examiner* — Ojo O Oyebisi
(74) *Attorney, Agent, or Firm* — Hovey Williams LLP

(57) ABSTRACT

A business method to reverse an authorization request denial made according to general guidelines if the particular customer and the particular transaction pass various threshold tests. Alternatively, each customer is assigned different and independent personal thresholds for transaction types, amounts, times, locations, and context. These thresholds are then applied if an instant payment transaction request is about to be declined.

20 Claims, 27 Drawing Sheets

(56) References Cited

U.S. PATENT DOCUMENTS

| | | | |
|---|---|---|---|
| 8,401,990 | B2 | 3/2013 | Silsby |
| 9,069,737 | B1 | 6/2015 | Kimotho et al. |
| 9,134,215 | B1 | 9/2015 | Vignisson et al. |
| 9,996,694 | B2 | 6/2018 | Sethumadhavan et al. |
| 10,817,530 | B2 | 10/2020 | Siebel et al. |
| 2002/0147754 | A1 | 10/2002 | Dempsey et al. |
| 2006/0171509 | A1 | 8/2006 | Berthaud et al. |
| 2007/0239936 | A1 | 10/2007 | Gluhovsky |
| 2010/0191634 | A1* | 7/2010 | Macy .............. G06N 3/08 705/35 |
| 2013/0290317 | A1 | 10/2013 | Spivack et al. |
| 2014/0058914 | A1 | 2/2014 | Song et al. |
| 2015/0100568 | A1 | 4/2015 | Golden et al. |
| 2017/0006135 | A1 | 1/2017 | Siebel et al. |
| 2017/0289176 | A1 | 10/2017 | Chen et al. |
| 2018/0032723 | A1 | 2/2018 | Danger et al. |
| 2019/0007517 | A1 | 1/2019 | Jagannath et al. |

OTHER PUBLICATIONS

Office Action from U.S. Appl. No. 16/226,246 (dated Dec. 15, 2020).
Ex Parte Quayle Action from U.S. Appl. No. 16/369,626 (dated Jan. 7, 2021).
Office Action from U.S. Appl. No. 16/299,998 dated Aug. 18, 2022.
Office Action From U.S. Appl. No. 16/264,144 dated Jul. 22, 2022.
Office Action From U.S. Appl. No. 16/264,144 dated Aug. 25, 2022.
Office Action From U.S. Appl. No. 16/424,187 dated Sep. 2, 2022.
Office Action From U.S. Appl. No. 16/264,144 (dated Oct. 16, 2020).
Office Action From U.S. Appl. No. 16/168,566 (dated Dec. 18, 2020).
Office Action From U.S. Appl. No. 15/866,563 (dated Nov. 27, 2020).
Office Action from U.S. Appl. No. 16/168,566 (dated Mar. 23, 2021).
Office Action from U.S. Appl. No. 16/226,246 (dated Apr. 26, 2021).
Office Action from U.S. Appl. No. 16/264,144 (dated Apr. 23, 2021).
Office Action from U.S. Appl. No. 16/663,452 (dated Mar. 12, 2021).
Office Action from U.S. Appl. No. 16/743,009 (dated Mar. 24, 2021).
Office Action From U.S. Appl. No. 16/424,187 (dated Apr. 26, 2022).
Office Action From U.S. Appl. No. 16/264,144 (dated Apr. 13, 2022).
Office Action from U.S. Appl. No. 16/168,566 (dated Jul. 21, 2021).
Office Action from U.S. Appl. No. 16/264,144 (dated Sep. 22, 2021).
Office Action from U.S. Appl. No. 16/424,187 (dated Sep. 1, 2021).
Office Action from U.S. Appl. No. 16/663,452 (dated Aug. 17, 2021).
Office Action from U.S. Appl. No. 16/743,009 (dated Sep. 10, 2021).
Office Action From U.S. Appl. No. 16/424,187 (dated Dec. 9, 2021).
Office Action From U.S. Appl. No. 16/743,009 (dated Jan. 28, 2022).
Office Action From U.S. Appl. No. 16/424,187 dated Feb. 24, 2023.
Office Action From U.S. Appl. No. 17/153,013 dated Mar. 2, 2023.
Office Action From U.S. Appl. No. 17/364,319 dated Mar. 9, 2023.
Office Action From U.S. Appl. No. 17/992,672 dated Mar. 10, 2023.
Office Action From U.S. Appl. No. 17/364,450 dated Mar. 31, 2023.
Office Action From U.S. Appl. No. 16/299,998 dated Apr. 13, 2023.
Office Action From U.S. Appl. No. 16/299,998 dated Dec. 23, 2022.
Office Action From U.S. Appl. No. 17/085,109 dated Feb. 2, 2023.
Office Action From U.S. Appl. No. 17/085,109 dated Dec. 8, 2022.

\* cited by examiner

| Euclidean | $d(X_i, X_j) = \sqrt{\sum_{k=1}^{M}(X_{i,k}-X_{j,k})^2}$ |
|---|---|
| Manhattan | $d(X_i, X_j) = \sum_{k=1}^{M}|X_{i,k}-X_{j,k}|$ |
| Normalized Euclidean | $d(X_i, X_j) = \sqrt{\frac{1}{M}\sum_{k=1}^{M}\left(\frac{X_{i,k}-X_{j,k}}{max_k-min_k}\right)^2}$ |
| Normalized Manhattan | $d(X_i, X_j) = \frac{1}{M}\sum_{k=1}^{M}\left|\frac{X_{i,k}-X_{j,k}}{max_k-min_k}\right|$ |
| Weighted-Euclidean | $d(X_i, X_j) = \sqrt{\sum_{k=1}^{M}b_i*(X_{i,k}-X_{j,k})^2}$ |

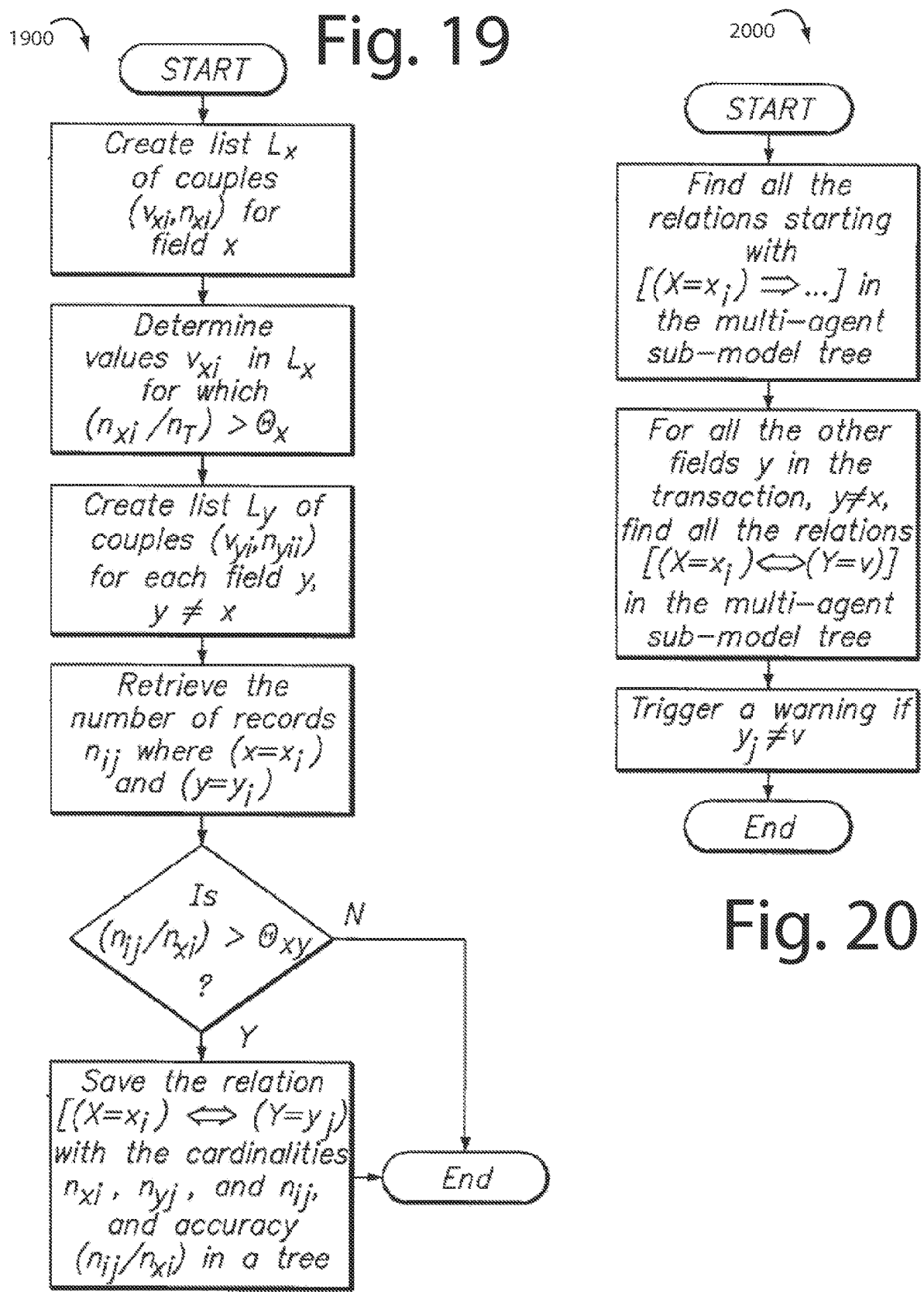

| Global Similarity Measure | Expression |
|---|---|
| City-block | $\frac{1}{p} \sum_{j=1}^{p} sim_j(V_{1j}, V_{2j})$ |
| Weighted city-block | $\frac{1}{p} \sum_{j=1}^{p} w_j * sim_j(V_{1j}, V_{2j})$ |
| Euclidean | $\frac{1}{p} \sqrt{\sum_{j=1}^{p} sim_j(V_{1j}, V_{2j})^2}$ |
| Minkowski | $\frac{1}{p} \sqrt[r]{\sum_{j=1}^{p} sim_j(V_{1j}, V_{2j})^r}$ |
| Weighted Minkowski | $\sqrt[r]{\sum_{j=1}^{p} w_j * sim_j(V_{1j}, V_{2j})^r}$ |
| Weighted maximum | $max_j \; w_j * sim_j(V_{1j}, V_{2j})$ |

Fig. 26

| Local Similarity Measures | Field Type | Field Valuation |
|---|---|---|
| $\begin{cases} 0, & \text{if } V_1 \cap V_2 = \emptyset \\ 1, & \text{otherwise} \end{cases}$ | Nominal | Single, multiple |
| $\dfrac{Card(V_1 \cup V_2) - Card(V_1 \cap V_2)}{Card(V_1 \cup V_2)}$ | Nominal | Multiple |
| $\dfrac{Card(V_1 \cup V_2) - Card(V_1 \cap V_2)}{Min(V_1 \cup V_2)}$ | Nominal | Multiple |
| $\dfrac{Card(V_1 \cup V_2) - Card(V_1 \cap V_2)}{Max(V_1 \cup V_2)}$ | Nominal | Multiple |
| $\dfrac{Card(V_1 \cup V_2) - Card(V_1 \cap V_2)}{Card(O)}$ | Nominal | Multiple |
| $\dfrac{ec(min(V_1^-, V_2^-), max(V_1^+, V_2^+)) - Card(V_1 \cap V_2)}{Card(O)}$ | Ordinal, Numeric | Multiple |
| $\dfrac{\lvert V_1 - V_2 \rvert}{ec(O)}$ | Numeric | Single |
| $\dfrac{\lvert V_{1c} - V_{2c} \rvert}{ec(O)}$ | Numeric | Multiple |
| $\dfrac{ec(min(V_1^-, V_2^-), max(V_1^+, V_2^+)) - ec(V_1 \cap V_2)}{ec(O)}$ | Numeric | Multiple |
| $\dfrac{ec(V_1 \cup V_2) - ec(V_1 \cap V_2)}{ec(V_1 \cup V_2)}$ | Numeric | Multiple |
| $\dfrac{ec(V_1 \cup V_2) - ec(V_1 \cap V_2)}{min(ecV_1, ecV_2)}$ | Numeric | Multiple |
| $\dfrac{ec(V_1 \cup V_2) - ec(V_1 \cap V_2)}{max(ecV_1, ecV_2)}$ | Numeric | Multiple |
| $\dfrac{2 \ast h(V_1 \cup V_2) - h(V_1) - h(V_2)}{2 \ast h_{max}}$ | Taxonomic | Multiple |
| $\dfrac{h(\text{node that unit } V_1 \text{ \& } V_2)}{\text{total height of } h}$ | Taxonomic | Single |

US 11,748,758 B2

METHOD FOR IMPROVING OPERATING PROFITS WITH BETTER AUTOMATED DECISION MAKING WITH ARTIFICIAL INTELLIGENCE

RELATED APPLICATIONS

The current patent application is a continuation patent application which claims priority benefit with regard to all common subject matter to identically-titled U.S. patent application Ser. No. 16/601,226, filed Oct. 14, 2019, which, itself, is a continuation application of identically-titled U.S. patent application Ser. No. 14/938,844, filed Nov. 12, 2015, which, itself, is a continuation-in-part application of and claims priority benefit with regard to all common subject matter to: (A) U.S. patent application Ser. No. 14/815,848, filed Jul. 31, 2015, and entitled AUTOMATION TOOL DEVELOPMENT METHOD FOR BUILDING COMPUTER FRAUD MANAGEMENT APPLICATIONS, which, itself, is a continuation-in-part application of and claims priority benefit with regard to all common subject matter to U.S. patent application Ser. No. 14/514,381, filed Oct. 15, 2014, and entitled ARTIFICIAL INTELLIGENCE FRAUD MANAGEMENT SOLUTION; (B) U.S. patent application Ser. No. 14/815,934, filed Jul. 31, 2015, and entitled METHOD FOR DETECTING MERCHANT DATA BREACHES WITH A COMPUTER NETWORK SERVER; (C) U.S. patent application Ser. No. 14/690,380, filed Apr. 18, 2015, and entitled PAYMENT AUTHORIZATION DATA PROCESSING SYSTEM FOR OPTIMIZING PROFITS OTHERWISE LOST IN FALSE POSITIVES; and (D) U.S. patent application Ser. No. 14/521,667, filed Oct. 23, 2014, and entitled BEHAVIOR TRACKING SMART AGENTS FOR ARTIFICIAL INTELLIGENCE FRAUD PROTECTION AND MANAGEMENT. The listed earlier-filed non-provisional applications are hereby incorporated by reference in their entireties into the current patent application.

BACKGROUND OF THE INVENTION

Field of the Invention

The present invention relates to a method for improving the profitability, and more specifically to accepting increased transaction risks of selected customers in selected transactions.

Background

Some customers generate far more business income for providers than do their average customers. So conventional fraud-scoring mechanisms that treat customers all the same are silently wasting substantial business and profits. By one account, eleven percent of customers that suffered a false positive "transaction declined" experience did not use the same payment again for three months. A competitor got the business. Institutions using fraud scoring alone lose far more business to customers' retaliation, disappointment, and embarrassment than that of the risk of approving a seemingly dubious transaction.

When a financial authorization data processing system declines a fraudulent transaction, it's done its job and profits are not lost to fraud. Similarly, when a legitimate transaction is approved, it's again done its job and profits are made this time on the genuine business. But, whenever the financial authorization data processing system delivers a false negative, a fraudulent transaction gets authorized. It's accepted as a cost of doing business, and these keep the fraudsters coming back for another bite.

Whenever a financial authorization data processing system delivers a false positive, a legitimate transaction gets declined. That mistake, however, can cost big because it discourages and disappoints legitimate customers who may stay away for months and never come back. (They have too many alternative payments available to them.) For example, stopping $5 billion in fraud makes no sense if the fraud scoring mechanism drove away $80 billion in profits. And that seems to be the case with conventional financial authorization data processing systems.

The consequential behavioral impacts on customers and clients should be factored into credit authorization decisions, as well as the quality of the business being obstructed. The old saying applies here, "Penny wise and pound foolish." But with this card issuers are being prudent and thrifty focusing on fraud, transaction-by-transaction, but being inefficient and wasteful with revenues and profits on the whole.

SUMMARY OF THE INVENTION

Briefly, business method embodiments of the present invention will reverse an authorization request denial made according to general guidelines if the particular customer and the particular transaction pass various threshold tests. Alternatively, each customer is assigned different and independent personal thresholds for transaction types, amounts, times, locations, and context. These thresholds are then applied if an instant payment transaction request is about to be declined.

The above and still further objects, features, and advantages of the present invention will become apparent upon consideration of the following detailed description of specific embodiments thereof, especially when taken in conjunction with the accompanying drawings.

BRIEF DESCRIPTION OF THE DRAWINGS

FIGS. 12-29 provide greater detail regarding the construction and functioning of algorithms that are employed in FIGS. 1-11;

FIG. 12 is a schematic diagram of a neural network architecture used in a model;

FIG. 13 is a diagram of a single neuron in a neural network used in a model;

FIG. 14 is a flowchart of an algorithm for training a neural network;

FIG. 15 is an example illustrating a table of distance measures that is used in a neural network training process;

FIG. 16 is a flowchart of an algorithm for propagating an input record through a neural network;

FIG. 17 is a flowchart of an algorithm for updating a training process of a neural network;

FIG. 18 is a flowchart of an algorithm for creating intervals of normal values for a field in a training table;

FIG. 19 is a flowchart of an algorithm for determining dependencies between each field in a training table;

FIG. 20 is a flowchart of an algorithm for verifying dependencies between fields in an input record;

FIG. 21 is a flowchart of an algorithm for updating a smart-agent technology;

FIG. 22 is a flowchart of an algorithm for generating a data mining technology to create a decision tree based on similar records in a training table;

FIG. 23 is an example illustrating a decision tree for a database maintained by an insurance company to predict a risk of an insurance contract based on a type of a car and a age of its driver;

FIG. 24 is a flowchart of an algorithm for generating a case-based reasoning technology to find a case in a database that best resembles a new transaction;

FIG. 25 is an example illustrating a table of global similarity measures used by a case-based reasoning technology;

FIG. 26 is an example illustrating a table of local similarity measures used by a case-based reasoning technology;

FIG. 27 is an example illustrating a rule for use with a rule-based reasoning technology;

FIG. 28 is an example illustrating a fuzzy rule to specify if a person is tall;

FIG. 29 is a flowchart of an algorithm for applying rule-based reasoning, fuzzy logic, and constraint programming to assess the normality/abnormality of and classify a transaction assess an activity;

DETAILED DESCRIPTION OF THE INVENTION

Computer-implemented method embodiments of the present invention provide an artificial intelligence and machine-learning service that is delivered on-demand to user-service consumers, their clients, and other users through network servers. The methods are typically implemented with special algorithms executed by computer apparatus and delivered to non-transitory storage mediums to the providers and user-service consumers who then sell or use the service themselves.

Users in occasional or even regular need of artificial intelligence and machine learning Prediction Technologies can get the essential data-science services required on the Cloud from an appropriate provider, instead of installing specialized hardware and maintaining their own software. Users are thereby freed from needing to operate and manage complex software and hardware. The intermediaries manage user access to their particular applications, including quality, security, availability, and performance.

Figure 1:
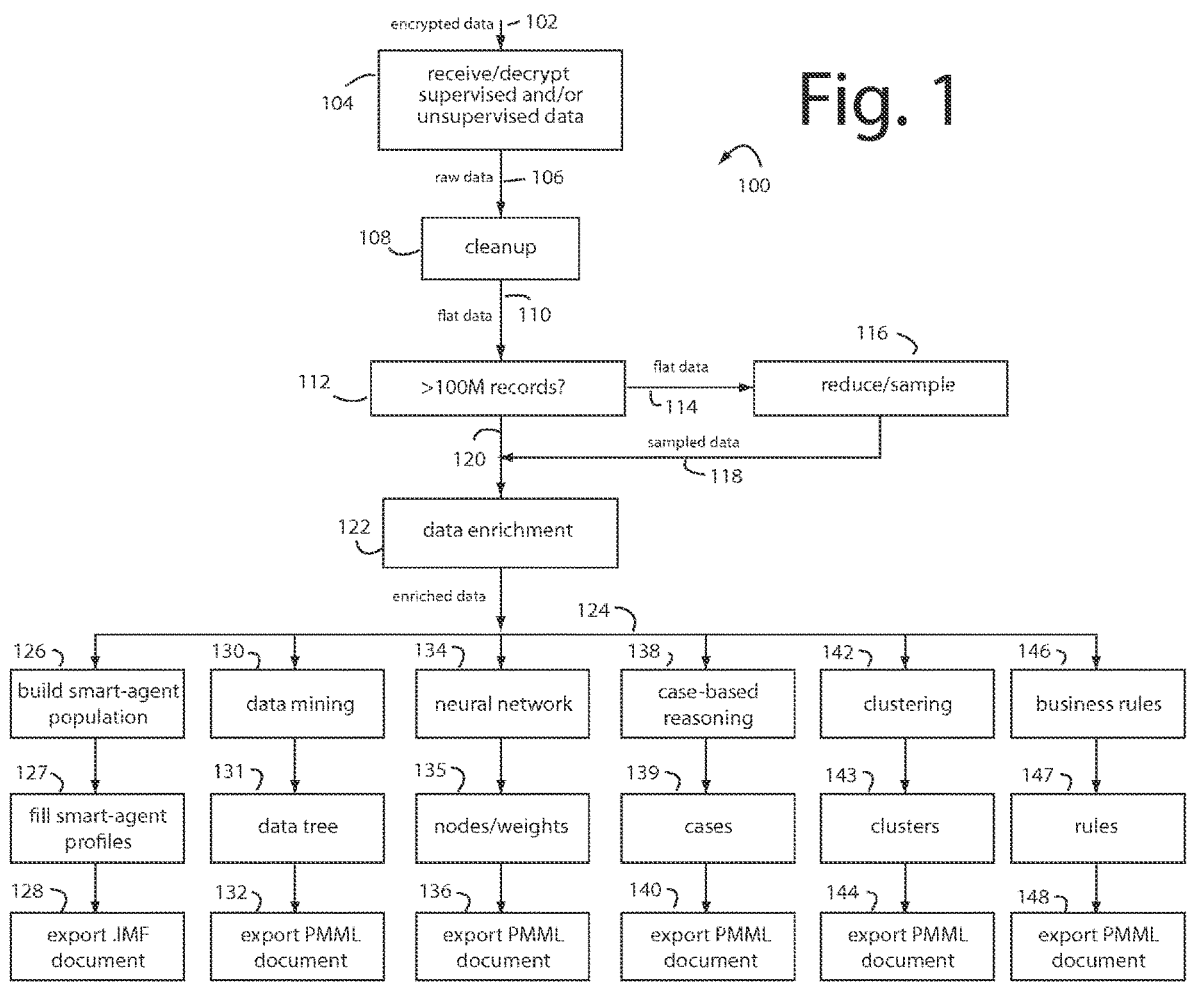
FIG. 1 is a flowchart of a method embodiment of the present invention that provides user-service consumers with data science as-a-service.

FIG. 1 represents a predictive model learning method 100 that provides artificial intelligence and machine learning as-a-service by generating predictive models from service-consumer-supplied training data input records. A computer file 102 previously hashed or encrypted by a triple-DES algorithm, or similar protection. It also possible to send a non-encrypted filed through an encrypted channel. Users of the platform would upload their data through SSL/TLS from a browser or from a command line interface (SCP or SFTP). This is then received by a network server from a service consumer needing predictive models. Such encode the supervised and/or unsupervised data of the service consumer that are essential for use in later steps as training inputs. The records 102 received represent an encryption of individual supervised and/or unsupervised records each comprising a predefined plurality of predefined data fields that communicate data values, and structured and unstructured text. Such text often represents that found in webpages, blogs, automated news feeds, etc., and very often such contains errors and inconsistencies.

Structured text has an easily digested form and unstructured text does not. Text mining can use a simple bag-of-words model, such as how many times does each word occur. Or complex approaches that pull the context from language structures, e.g., the metadata of a post on Twitter where the unstructured data is the text of the post.

Figure 2:
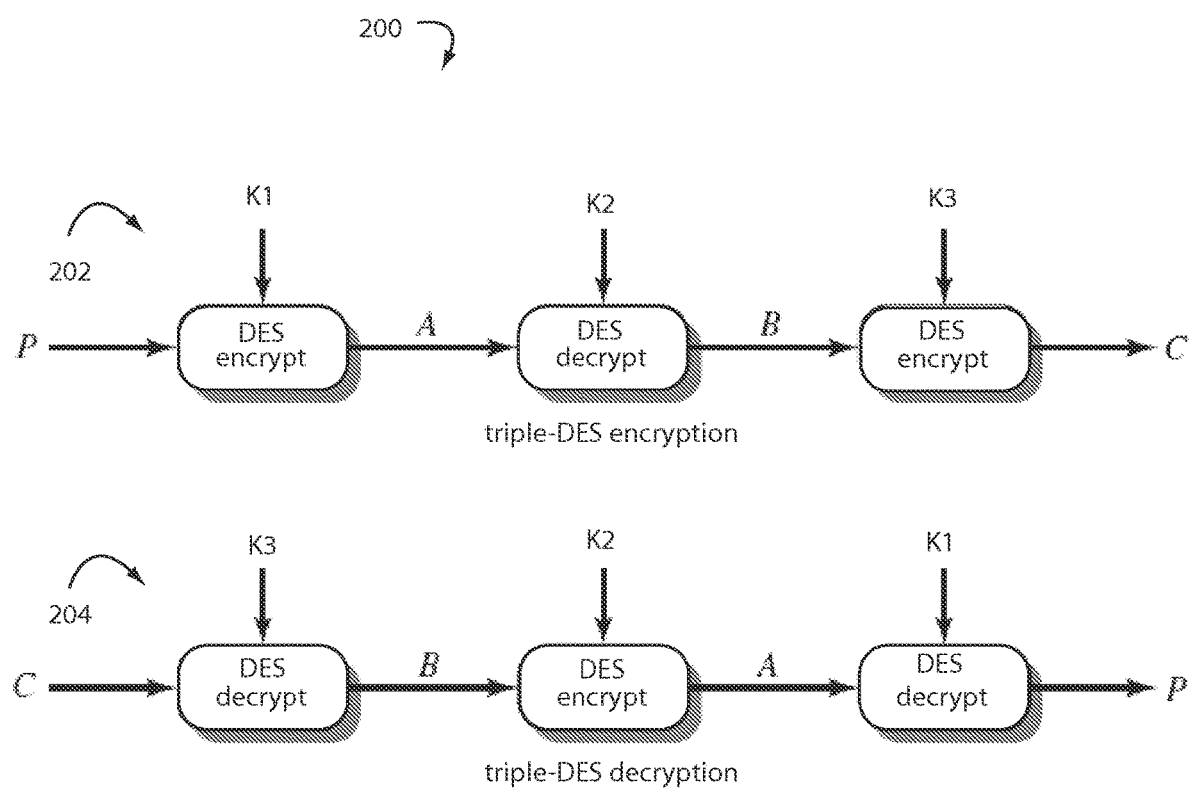
FIG. 2 is a flowchart diagram of an algorithm for triple data encryption standard encryption and decryption as used in the method of FIG. 1.

These records 102 are decrypted in a step 104 with an apparatus for executing a decoding algorithm, e.g., a standard triple-DES device that uses three keys. An example is illustrated in FIG. 2. A series of results are transformed into a set of non-transitory, raw-data records 106 that are collectively stored in a machine-readable storage mechanism.

Figure 3A:
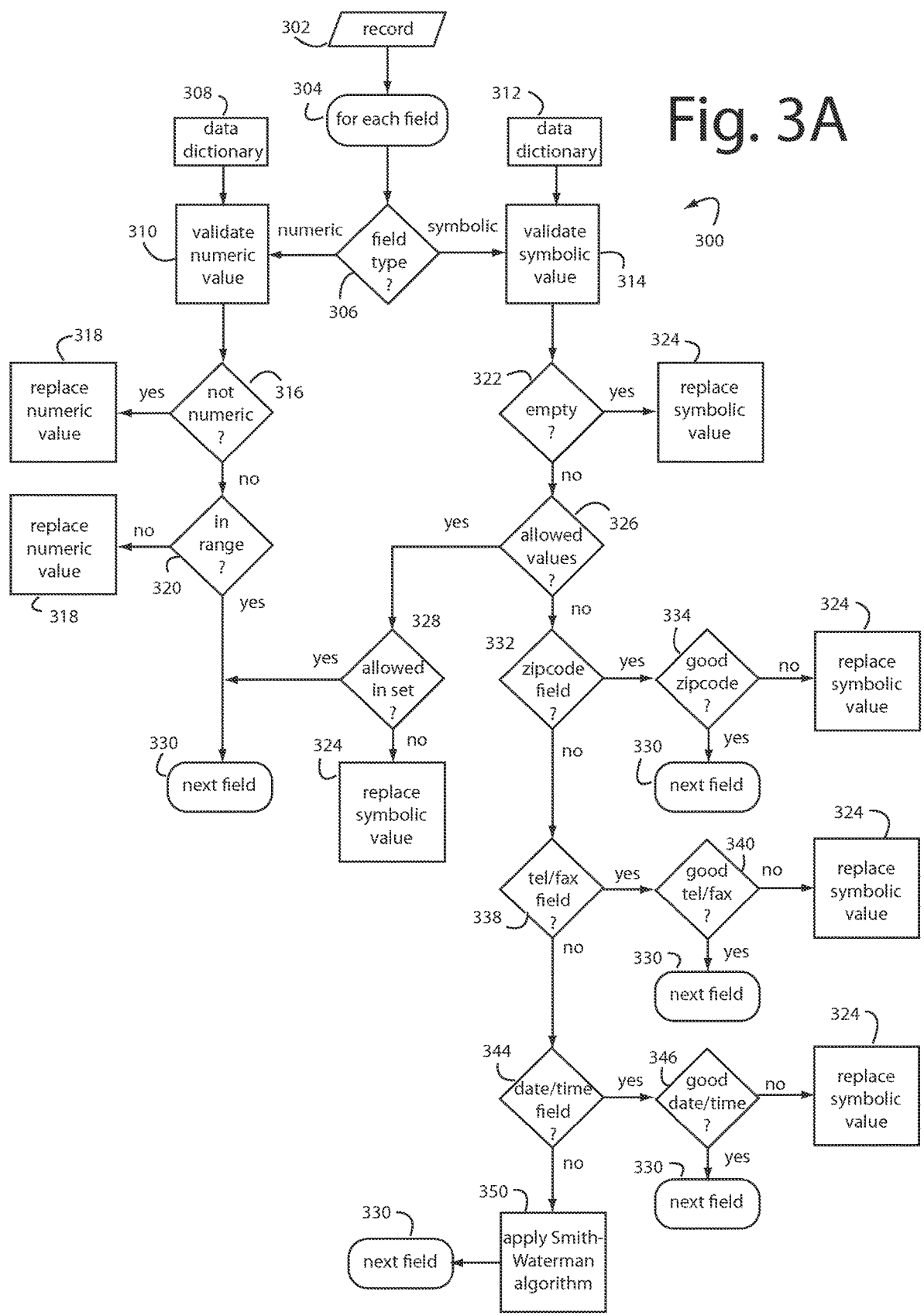
FIG. 3A is a flowchart diagram of an algorithm for data cleanup as used in the method of FIG. 1.
Figure 3B:
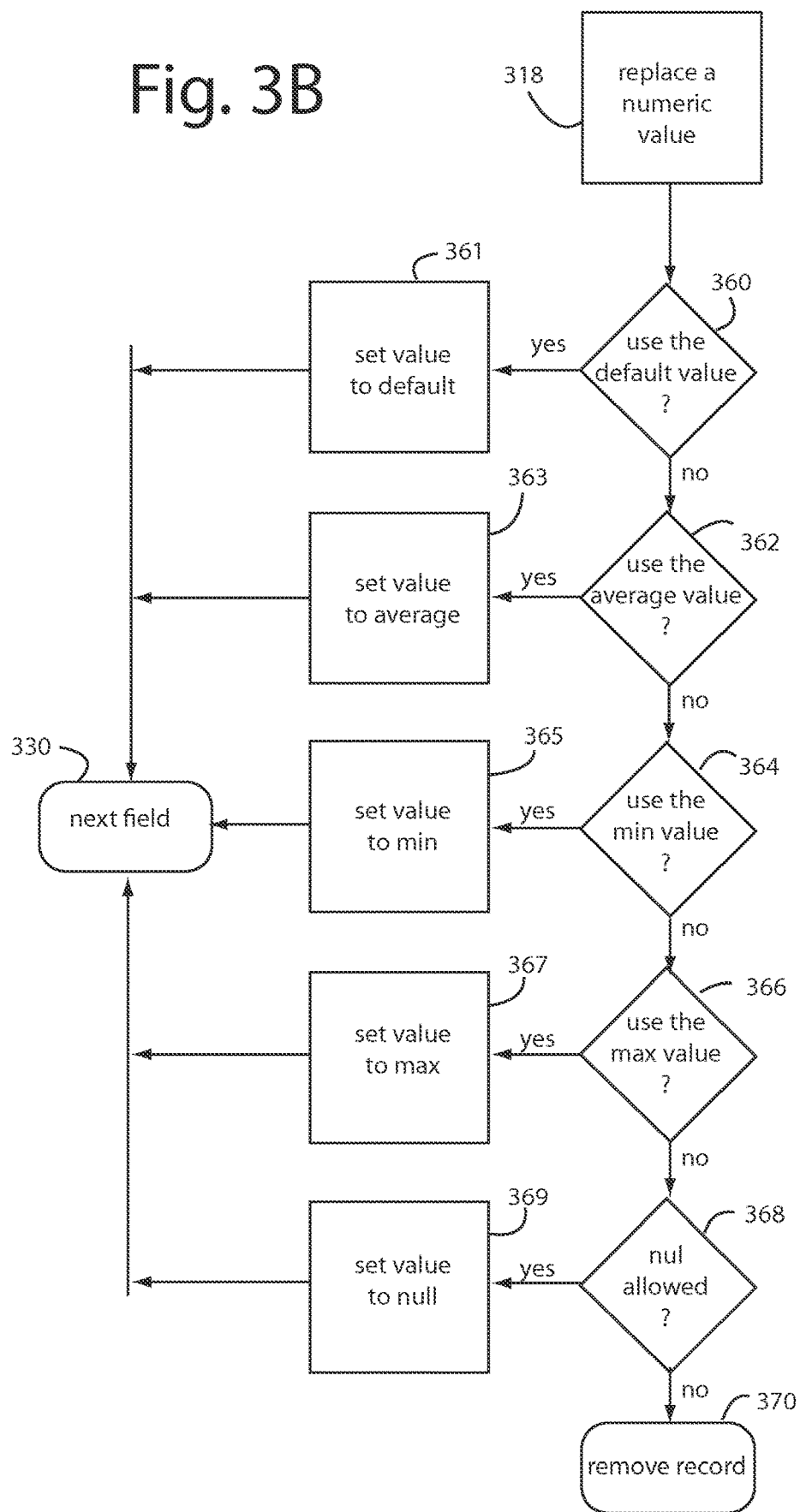
FIG. 3B is a flowchart diagram of an algorithm for replacing a numeric value as used in the method of FIG. 3A.
Figure 3C:
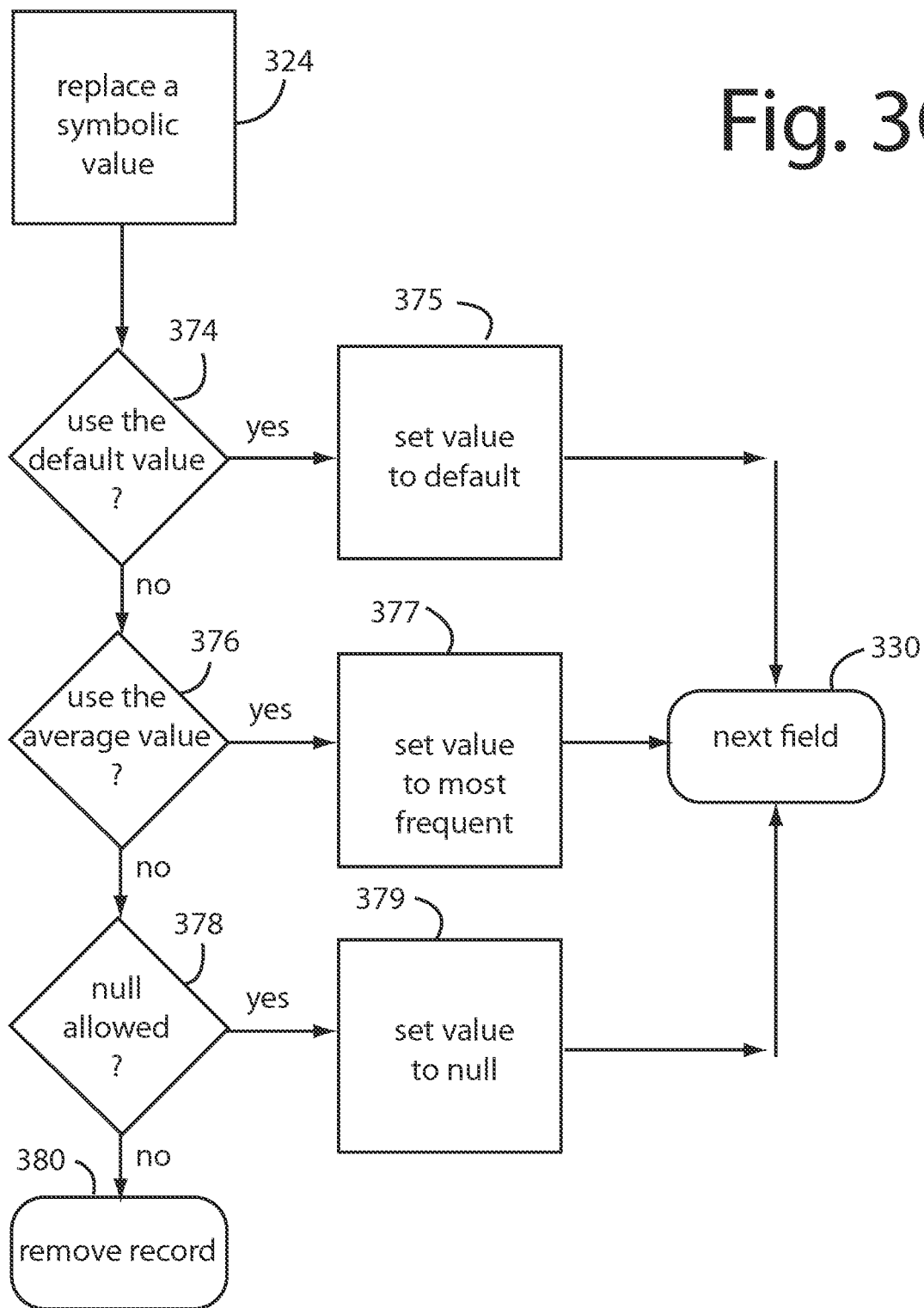
FIG. 3C is a flowchart diagram of an algorithm for replacing a symbolic value as used in the method of FIG. 3A.

A step 108 cleans up and improves the integrity of the data stored in the raw-data records 106 with an apparatus for executing a data integrity analysis algorithm. An example is illustrated in FIGS. 3A, 3B, and 3C. Step 108 compares and corrects any data values in each data field according to user-service consumer preferences like min, max, average, null, and default, and a predefined data dictionary of valid data values. Step 108 discerns the context of the structured and unstructured text with an apparatus for executing a contextual dictionary algorithm. Step 108 transforms each result into a set of flat-data records 110 that are collectively stored in a machine-readable storage mechanism.

In a step 112, a test is made to see if a number of records 114 in the set of flat-data records 110 exceeds a predefined threshold, e.g., about one hundred million. The particular cutoff number to use is inexact and is empirically determined by what produces the best commercial efficiencies.

Figure 4:
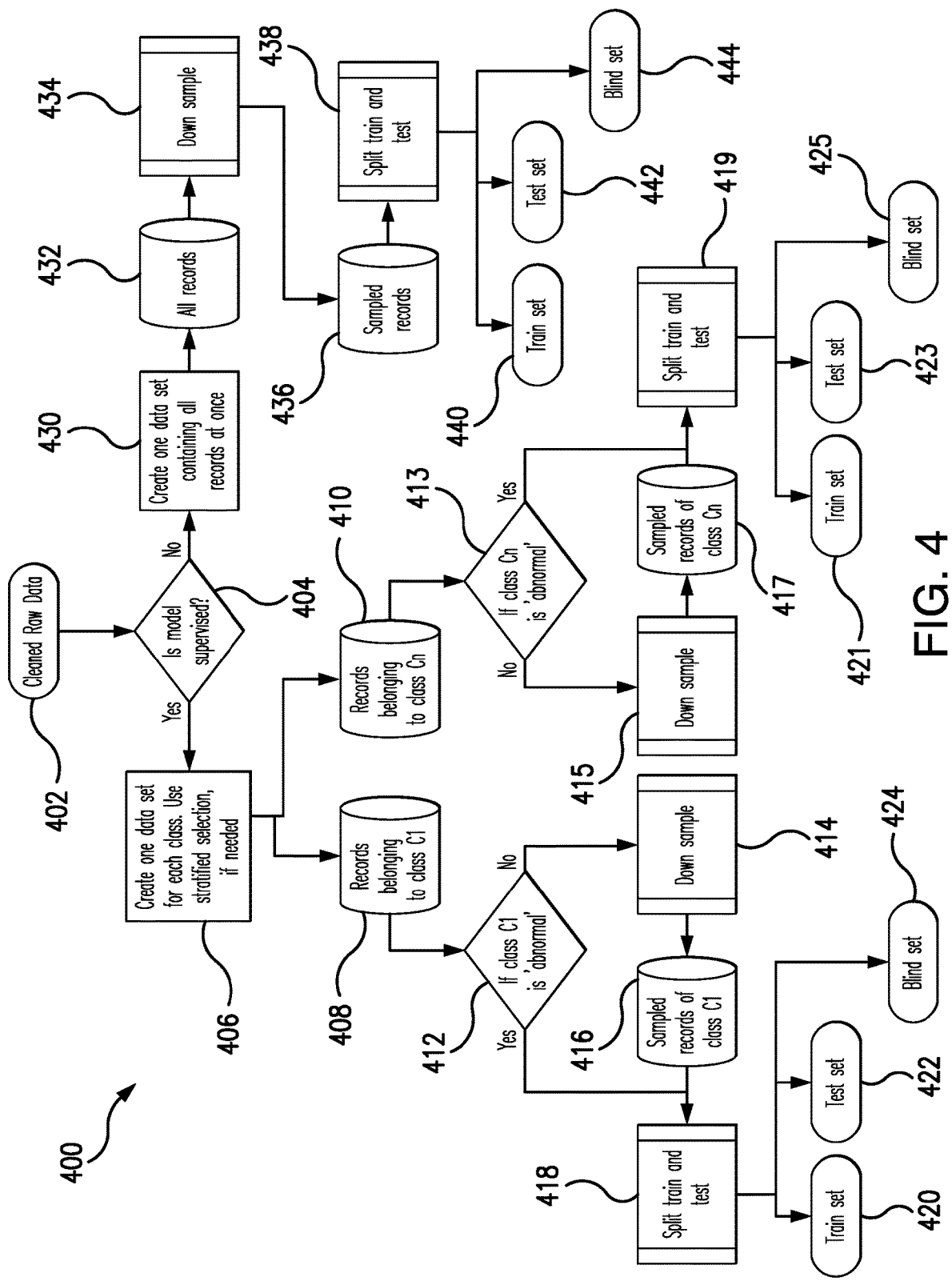
FIG. 4 is a flowchart diagram of an algorithm for building training sets, test sets, and blind sets, and further for down sampling if needed and as used in the method of FIG. 1.

But if the number of records 114 is too large, a step 116 then samples a portion of the set of flat-data records 110. An example is illustrated in FIG. 4. Step 116 stores a set of samples 118 in a machine-readable storage mechanism for use in the remaining steps. Step 116 consequently employs an apparatus for executing a special sampling algorithm that limits the number of records that must be processed by the remaining steps, but at the same time preserves important training data. The details are described herein in connection with FIG. 4.

A modeling data 120 is given a new, amplified texture by a step 122 for enhancing, enriching, and concentrating the sampled or unsampled data stored in the flat-data records with an apparatus for executing a data enrichment algorithm. An example apparatus is illustrated in FIG. 4, which outputs training sets 420, 421, and 440; and test sets 422, 423, and 442; and blind sets 424, 425, and 444 derived from either the flat data 110 or sampled data 118. Such step 122 removes data that may exist in particular data fields that is less important to building predictive models. Entire data fields themselves are removed here that are predetermined to be unavailing to building good predictive models that follow.

Step 122 calculates and combines any data it has into new data fields that are predetermined to be more important to building such predictive models. It converts text with an apparatus for executing a context mining algorithm, as suggested by FIG. 6. Even more details of this are suggested in my U.S. patent application Ser. No. 14/613,383, filed Feb. 4, 2015, and titled, ARTIFICIAL INTELLIGENCE FOR CONTEXT CLASSIFIER. Step 122 then transforms a plurality of results from the execution of these algorithms into a set of enriched-data records 124 that are collectively stored in a machine-readable storage mechanism.

Figure 6:
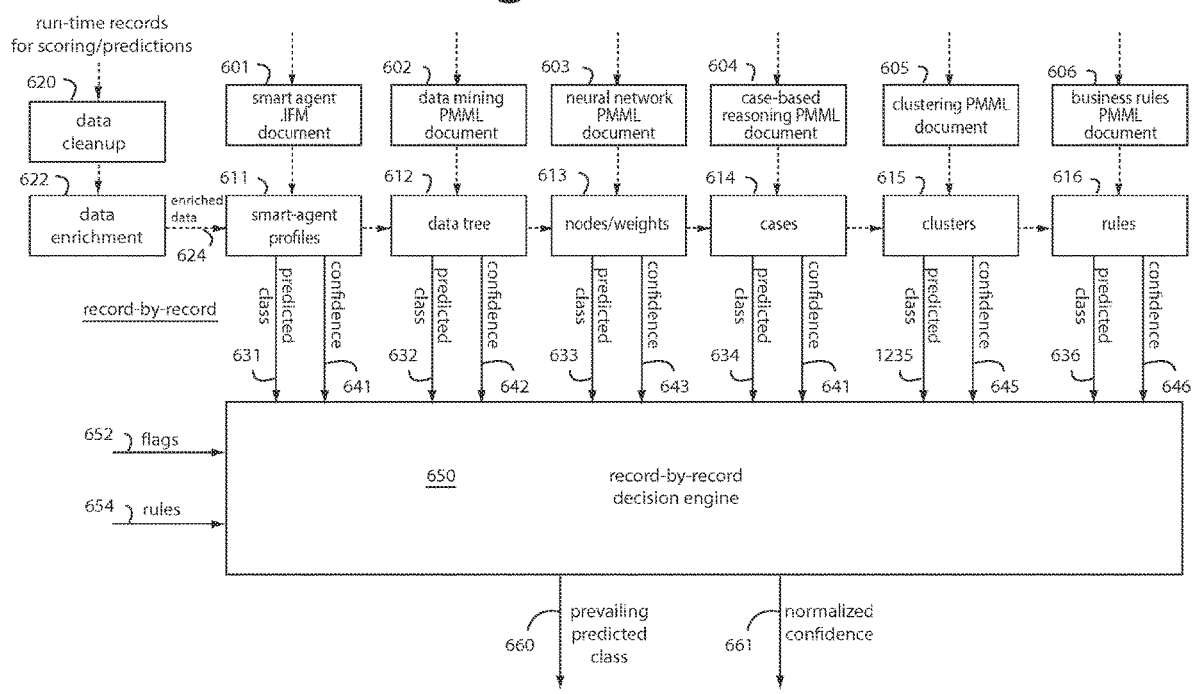
FIG. 6 is a flowchart diagram of a method for using the PMML Documents of FIG. 1 with an algorithm for the run-time operation of parallel predictive model technologies.

A step 126 uses the set of enriched-data records 124 to build a plurality of smart-agent predictive models for each entity represented. Step 126 employs an apparatus for executing a smart-agent building algorithm. The details of this are shown in FIG. 6. Further related information is included in my U.S. Pat. No. 7,089,592 B2, issued Aug. 8, 2006, titled, SYSTEMS AND METHODS FOR DYNAMIC DETECTION AND PREVENTION OF ELECTRONIC FRAUD, which is incorporated herein by reference. (Herein, Adjaoute '592.) Special attention should be placed on FIGS. 11-30 and the descriptions of smart-agents in connection with FIG. 21 and the smart-agent technology in Columns 16-18.

Unsupervised Learning of Normal and Abnormal Behavior

Each field or attribute in a data record is represented by a corresponding smart-agent. Each smart-agent representing a field will build what-is-normal (normality) and what-is-abnormal (abnormality) metrics regarding other smart-agents.

Apparatus for creating smart-agents is supervised or unsupervised. When supervised, an expert provides information about each domain. Each numeric field is characterized by a list of intervals of normal values, and each symbolic field is characterized by a list of normal values. It is possible for a field to have only one interval. If there are no intervals for an attribute, the system apparatus can skip testing the validity of its values, e.g., when an event occurs.

As an example, a doctor (expert) can give the temperature of the human body as within an interval [35° C.:41° C.], and the hair colors can be {black, blond, red}.

1) For each field "a" of a Table:
   i) Retrieve all the distinct values and their cardinalities and create a list "La" of couples (vai, nai);
   ii) Analyze the intermediate list "La" to create the list of intervals of normal values la with this method:
     (a) If "a" is a symbolic attribute, copy each member of "La" into la when nai is superior to a threshold $\Theta$ min;
     (b) If "a" is a numeric attribute:
       1. Order the list "La" starting with the smallest values "va";
       2. While La is not empty;
         i. Remove the first element ea = ( va1, na1) of "La"
         ii. Create an interval with this element: I' = [val, val]
         iii. While it is possible, enlarge this interval with the first elements of "La" and remove them from "La": I' = [va1, vak]. The loop stops before the size of the interval vak-val becomes greater than a threshold $\Theta_{dist}$.
     (c) given: na' = na1 + . . . + nak
     (d) If na' is superior to a threshold $\Theta$ min, Ia = I' otherwise, Ia = Ø;
   iii) If Ia is not empty, save the relation (a, Ia ).

An unsupervised learning process uses the following algorithm:

$\Theta_{min}$ represents the minimum number of elements an interval must include. This means that an interval will only be take into account if it encapsulates enough values, so its values will be considered normal because frequent;

the system apparatus defines two parameters that is modified:
   the maximum number of intervals for each attribute $n_{max}$;
   the minimum frequency of values in each interval $f_{Imin}$;
$\Theta_{min}$ is computed with the following method:

$$\Theta_{min} = f_{Imin} * \text{number of records in the table.}$$

$\Theta_{dist}$ represents the maximum width of an interval. This prevents the system apparatus from regrouping some numeric values that are too disparate. For an attribute a, lets call mina the smallest value of a on the whole table and maxa the biggest one. Then:

$$\Theta_{dist} = (\max a - \min a)/n_{max}$$

For example, consider a numeric attribute of temperature with the following values:

| 75 | 80 | 85 | 72 | 69 | 72 | 83 | 64 | 81 | 71 | 65 | 75 | 68 | 70 |
|----|----|----|----|----|----|----|----|----|----|----|----|----|----|

The first step is to sort and group the values into "La":
"La"={(64,1) (65,1) (68,1) (69,1) (70,1) (71,1) (72,2) (75,2) (80,1) (81,1) (83,1) (85,1)}
Then the system apparatus creates the intervals of normal values:
Consider $f_{Imin}$=10% and $n_{max}$=5 then $\Theta_{min}$=1.4 and $\Theta_{dist}$= (85−64)/5=4.2
Ia={[64,68][69,72][75][80,83]}

The interval [85,85] was removed because its cardinality (1) is smaller than $\Theta_{min}$.

When a new event occurs, the values of each field are verified with the intervals of the normal values it created, or that were fixed by an expert. It checks that at least one interval exists. If not, the field is not verified. If true, the value inside is tested against the intervals, otherwise a warning is generated for the field.

During creation, dependencies between two fields are expressed as follows:

When the field 1 is equal to the value v1, then the field 2 takes the value v2 in significant frequency p.

Example: when species is human the body temperature is 37.2° C. with a 99.5% accuracy.

Given cT is the number of records in the whole database. For each attribute X in the table:
Retrieve the list of distinct values for X with the cardinality of each value:

$$Lx=\{(x1,cx1), \ldots (xi,c_{xi}), \ldots (xn,cxn)\}$$

For each distinct value xi in the list:
Verify if the value is typical enough: $(c_{xi}/cT)>\Theta x$?
If true, for each attribute Y in the table, $Y \neq X$
Retrieve the list of distinct values for Y with the cardinality of each value:

$$Ly=\{(y1,cy1), \ldots (yj,c_{yj}), \ldots (yn,cyn)\}$$

For each value yj;
Retrieve the number of records $c_{ij}$ where (X=xi) and (Y=yj). If the relation is significant, save it: if $(c_{ij}/c_{xi})>\Theta xy$ then save the relation [(X=xi)⇒(Y=yj)] with the cardinalities $c_{xi}$, $c_{yj}$ and $c_{ij}$.
The accuracy of this relation is given by the quotient $(c_{ij}/c_{xi})$.
Verify the coherence of all the relations: for each relation [(X=xi)⇒(Y=yj)] (1)
Search if there is a relation [(Y=yj)⇒(X=xk)] (2)
If xi≠xk remove both relations (1) and (2) from the model otherwise it will trigger a warning at each event since (1) and (2) cannot both be true.
To find all the dependencies, the system apparatus analyses a database with the following algorithm:

The default value for $\Theta x$ is 1%: the system apparatus will only consider the significant value of each attribute.

The default value for $\Theta xy$ is 85%: the system apparatus will only consider the significant relations found.

A relation is defined by: $(Att_1=v_1) \Rightarrow (Att_2=v_2)$ (eq).

All the relations are stored in a tree made with four levels of hash tables, e.g., to increase the speed of the system apparatus. A first level is a hash of the attribute's name (Att1 in eq); a second level is a hash for each attribute the values that imply some correlations (v1 in eq); a third level is a hash of the names of the attributes with correlations (Att2 in eq) to the first attribute; a fourth and last level has values of the second attribute that are correlated (v2 in eq).

Each leaf represents a relation. At each leaf, the system apparatus stores the cardinalities $c_{xi}$, $c_{yj}$ and $c_{ij}$. This will allow the system apparatus to incrementally update the relations during its lifetime. Also it gives:

the accuracy of a relation: $c_{ij}/c_{xi}$;
the prevalence of a relation: $c_{ij}/cT$;
the expected predictability of a relation: $c_{yj}/cT$.

Consider an example with two attributes, A and B:

| A | B |
|---|---|
| 1 | 4 |
| 1 | 4 |
| 1 | 4 |
| 1 | 3 |
| 2 | 1 |
| 2 | 1 |
| 2 | 2 |
| 3 | 2 |
| 3 | 2 |
| 3 | 2 |

There are ten records: cT=10.
Consider all the possible relations:

| Relation | $C_{xi}$ | $C_{yi}$ | $C_{ij}$ | $(C_{xi}/C_T)$ | Accuracy | |
|---|---|---|---|---|---|---|
| (A = 1) ⇒ (B = 4) | 4 | 3 | 3 | 40% | 75% | (1) |
| (A = 2) ⇒ (B = 1) | 2 | 2 | 2 | 20% | 100% | (2) |
| (A = 3) ⇒ (B = 2) | 3 | 4 | 3 | 30% | 100% | (3) |
| (B = 4) ⇒ (A = 1) | 3 | 4 | 3 | 30% | 100% | (4) |
| (B = 3) ⇒ (A = 1) | 1 | 4 | 1 | 10% | 100% | (5) |
| (B = 1) ⇒ (A = 2) | 2 | 3 | 2 | 20% | 100% | (6) |
| (B = 2) ⇒ (A = 3) | 4 | 3 | 3 | 40% | 75% | (7) |

With the defaults values for $\Theta x$ and $\Theta xy$, for each possible relation, the first test $(c_{xi}/c_T)>\Theta x$ is successful (since $\Theta x=1\%$) but the relations (1) and (7) would be rejected (since $\Theta xy=85\%$).
Then the system apparatus verifies the coherence of each remaining relation with an algorithm:

(A = 2) ⇒ (B = 1) is coherent with (B = 1) ⇒ (A = 2);
(A = 3) ⇒ (B = 2) is not coherent since there is no more relation (B = 2) ⇒ . . . ;
(B = 4) ⇒ (A = 1) is not coherent since there is no more relation (A = 1) ⇒ . . .;
(B = 3) ⇒ (A = 1) is not coherent since there is no more relation (A = 1) ⇒ . . .;
(B = 1) ⇒ (A = 2) is coherent with (A = 2) = (B = 1).

The system apparatus classifies the normality/abnormality of each new event in real-time during live production and detection.

For each event couple attribute/value (X,xi): Looking in the model for all the relations starting by [(X=xi)⇒ . . . ]
For all the other couple attribute/value $(Y,y_j)$, $Y \neq X$, of the event:
Look in the model for a relation $[(X=x_i)\Rightarrow(Y=v)]$;
If $y_j \neq v$ then trigger a warning "$[(X=x_i)\Rightarrow(Y=y_j)]$ not respected".

Incremental Learning

Figure 7:
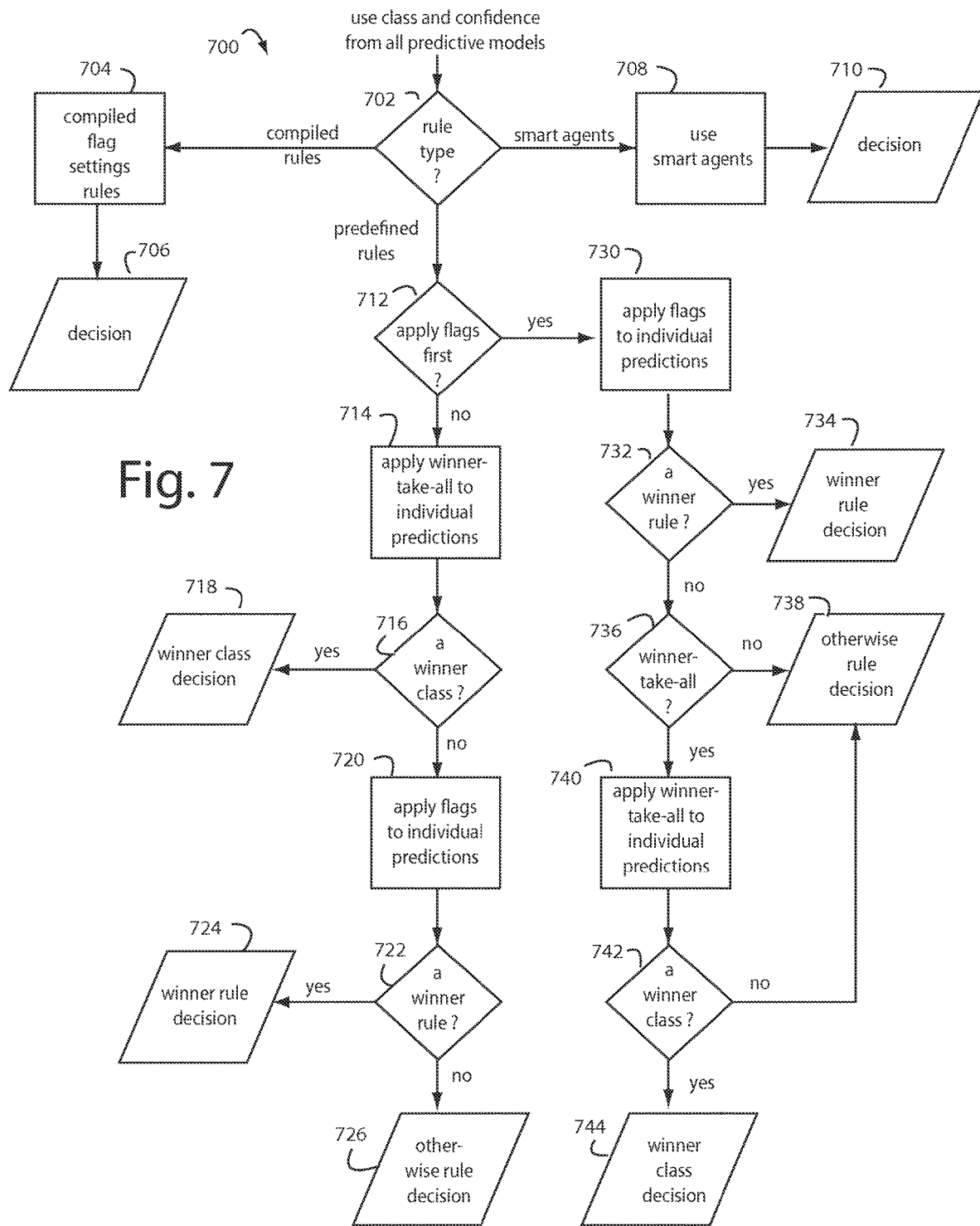
FIG. 7 is a flowchart diagram of an algorithm for the decision engine of FIG. 6.

The system apparatus incrementally learns with new events:
Increment cT by the number or records in the new table T.
For each relation [(X=xi)⇒(Y=yj)] previously created:
Retrieve its parameters: $c_{xi}$, $c_{yj}$ and $c_{ij}$
Increment $c_{xi}$ by the number of records in T where $X=x_i$;
Increment $c_{yj}$ by the number of records in T where $Y=y_j$;
Increment $c_{ij}$ by the number of records in T where $[(X=x_i)\Rightarrow(Y=y_j)]$;
Verify if the relation is still significant:
If $(c_{xi}/c_T)<\Theta_x$, remove this relation;
If $(c_{ij}/c_{xi})<\Theta_{xy}$, remove this relation.
In FIG. 1, a step 127 selects amongst a plurality of smart-agent predictive models and updates a corresponding particular smart-agent's real-time profile and long-term profile. Such profiles are stored in a machine-readable storage mechanism with the data from the enriched-data records 124. Each corresponds to a transaction activity of a particular entity. Step 127 employs an apparatus for executing a smart-agent algorithm that compares a current transaction, activity, behavior to previously memorialized transactions, activities and profiles such as illustrated in FIG. 7. Step 127 then transforms and stores a series of results as smart-agent predictive model in a markup language document in a machine-readable storage mechanism. Such smart-agent predictive model markup language documents are XML types and best communicated in a registered file extension format, ".IFM", marketed by Brighterion, Inc. (San Francisco, Calif.).

Figure 11:
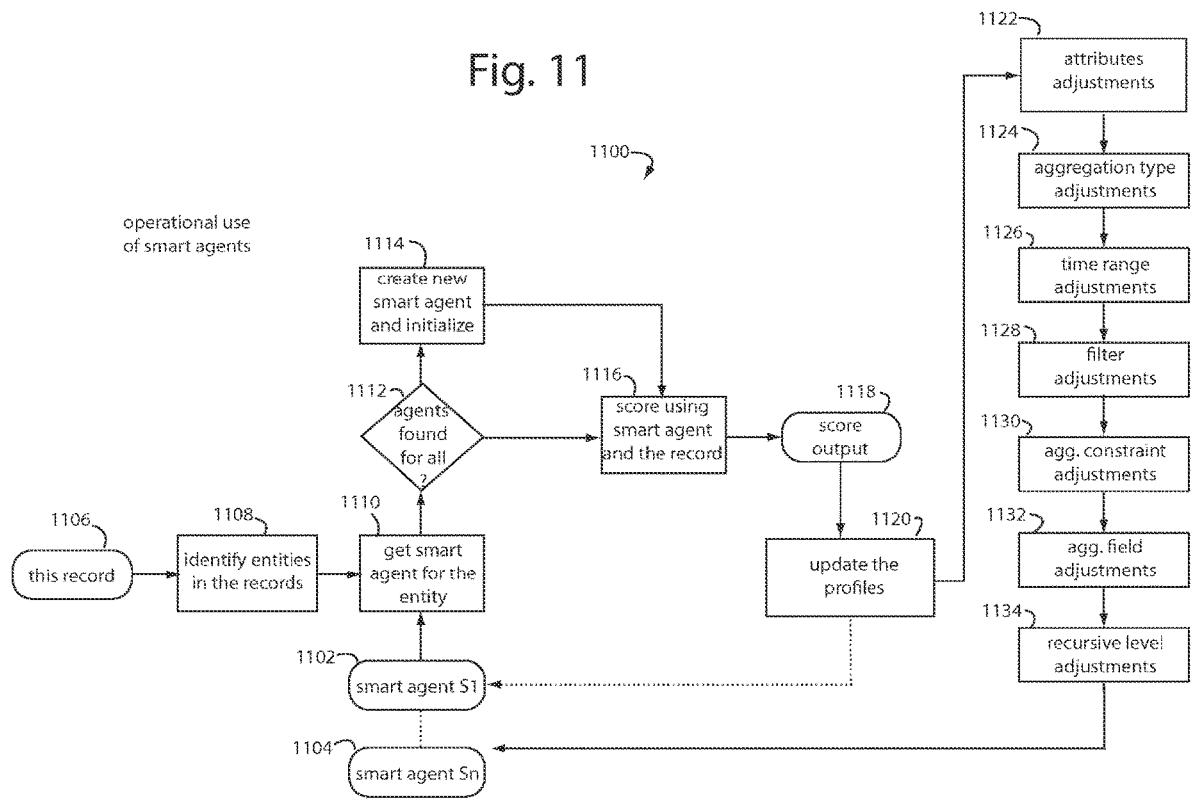
FIG. 11 is a flowchart diagram of an algorithm for the operational use of smart agents.

Steps 126 and 127 can both be implemented by the apparatus of FIG. 11 that executes algorithm 1100.

Figure 9:
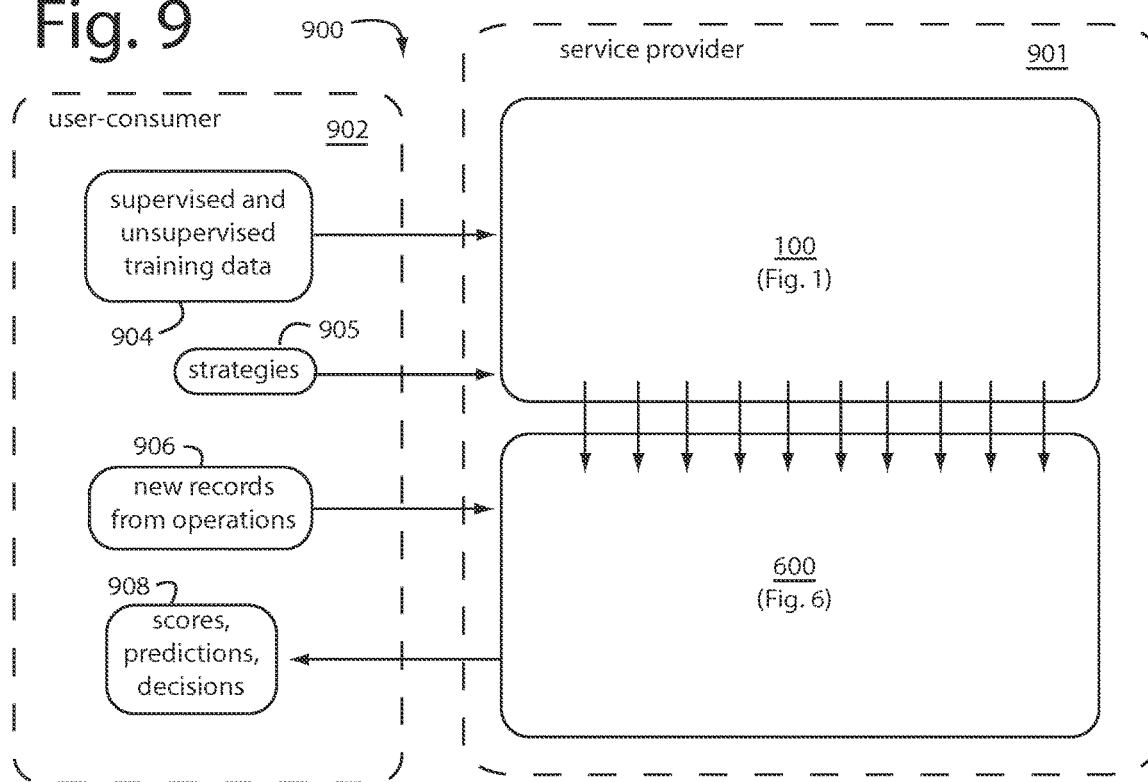
FIG. 9 is a flowchart diagram of a method that combines the methods of FIGS. 1-8 and their algorithms to provide an on-line service for scoring, predictions, and decisions to user-service consumers requiring data science and artificial intelligence services without their being required to invest in and maintain specialized equipment and software.

A step 128 exports the .IFM-type smart-agent predictive model markup language documents to a user-service consumer, e.g., using an apparatus for executing a data-science-as-a-service algorithm from a network server, as illustrated in FIGS. 6 and 9.

Figure 22:
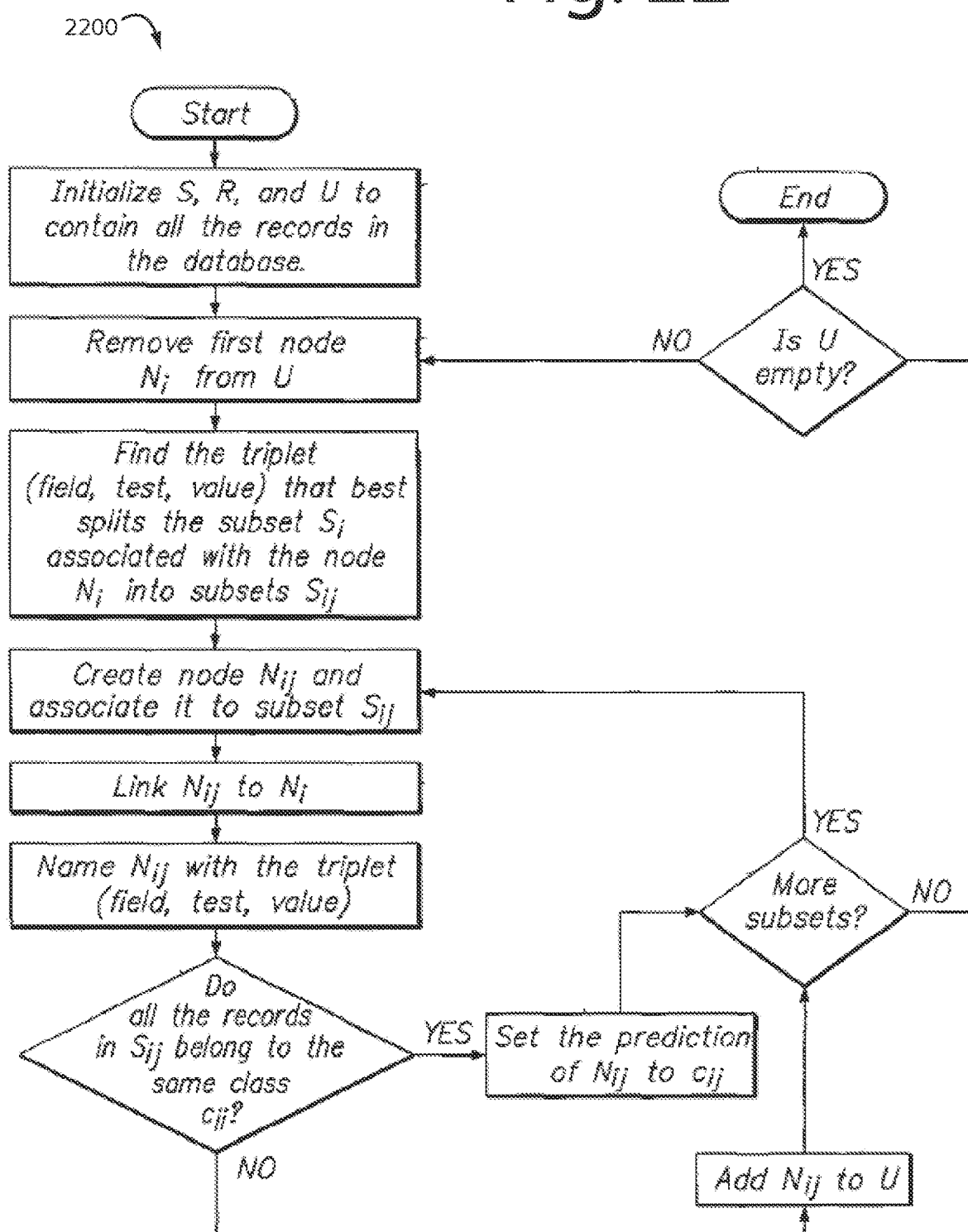

In alternative method embodiments of the present invention, Method 100 further includes a step 130 for building a data mining predictive model (e.g. 612, FIG. 6) by applying the same data from the samples of the enriched-data records 124 as an input to an apparatus for generating a data mining algorithm. For example, as illustrated in FIG. 22. A data-tree result 131 is transformed by a step 132 into a data-mining predictive model markup language document that is stored in a machine-readable storage mechanism. For example, as an industry standardized predictive model markup language (PMML) document. PMML is an XML-based file format developed by the Data Mining Group (dmg.org) to provide a way for applications to describe and exchange models produced by data mining and machine learning algorithms. It supports common models such as logistic regression and feed-forward neural networks. Further information related to data mining is included in Adjaoute '592. Special attention should be placed on FIGS. 11-30 and the descriptions of the data-mining technology in Columns 18-20.

Method 100 further includes an alternative step 134 for building a neural network predictive model (e.g. 613, FIG. 6) by applying the same data from the samples of the enriched-data records 124 as an input to an apparatus for generating a neural network algorithm. For example, as illustrated in FIG. 12-17. A nodes/weight result 135 is transformed by a step 136 into a neural-network predictive model markup language document that is stored in a machine-readable storage mechanism. Further information related to neural networks is included in Adjaoute '592. Special attention should be placed on FIGS. 13-15 and the descriptions of the neural network technology in Columns 14-16.

Method 100 further includes an alternative step 138 for building a case-based-reasoning predictive model (e.g. 614, FIG. 6) by applying the same data from the samples of the enriched-data records 124 as an input to an apparatus for generating a cased-based reasoning algorithm. As suggested by the algorithm of FIG. 25-26. A cases result 139 is transformed into a case-based-reasoning predictive model markup language document 140 that is stored in a machine-readable storage mechanism. Further information related to case-based-reasoning is included in Adjaoute '592. Special attention should be placed on FIGS. 24-25 and the descriptions of the case-based-reasoning technology in Columns 20-21.

Method 100 further includes an alternative step 142 for building a clustering predictive model (e.g. 615, FIG. 6) by applying the same data from the samples of the enriched-data records 124 as an input to an apparatus for generating a clustering algorithm. A clusters result 143 is transformed by a step 144 into a clustering predictive model markup language document that is stored in a machine-readable storage mechanism.

Clustering here involves the unsupervised classification of observations, data items, feature vectors, and other patterns into groups. In supervised learning, a collection of labeled patterns are used to determine class descriptions which, in turn, can then be used to label the new pattern. In the case of unsupervised clustering, the challenge is in grouping a given collection of unlabeled patterns into meaningful clusters.

Typical pattern clustering algorithms involve the following steps:

(1) Pattern representation: extraction and/or selection;
(2) Pattern proximity measure appropriate to the data domain;
(3) Clustering, and
(4) Assessment of the outputs.

Feature selection algorithms identify the most effective subsets of the original features to use in clustering. Feature extraction makes transformations of the input features into new relevant features. Either one or both of these techniques is used to obtain an appropriate set of features to use in clustering. Pattern representation refers to the number of classes and available patterns to the clustering algorithm. Pattern proximity is measured by a distance function defined on pairs of patterns.

A clustering is a partition of data into exclusive groups or fuzzy clustering. Using Fuzzy Logic, A fuzzy clustering method assigns degrees of membership in several clusters to each input pattern. Both similarity measures and dissimilarity measures are used here in creating clusters.

Method 100 further includes an alternative step 146 for building a business rules predictive model (e.g. 616, FIG. 6) by applying the same data from the samples of the enriched-data records 124 as an input to an apparatus for generating a business rules algorithm. As suggested by the algorithm of FIG. 27-29. A rules result 147 is transformed by a step 148 into a business rules predictive model markup language document that is stored in a machine-readable storage mechanism. Further information related to rule-based-reasoning is included in Adjaoute '592. Special attention should be placed on FIG. 27 and the descriptions of the rule-based-reasoning technology in Columns 20-21.

Each of Documents 128, 132, 136, 140, 144, and 146 is a tangible machine-readable transformation of a trained model and can be sold, transported, installed, used, adapted, maintained, and modified by a user-service consumer or provider.

FIG. 2 represents an apparatus 200 for executing an encryption algorithm 202 and a matching decoding algorithm 204, e.g., a standard triple-DES device that uses two keys. The Data Encryption Standard (DES) is a widely understood and once predominant symmetric-key algorithm for the encryption of electronic data. DES is the archetypal block cipher—an algorithm that takes data and transforms it through a series of complicated operations into another cipher text bit string of the same length. In the case of DES, the block size is 64 bits. DES also uses a key to customize the transformation, so that decryption can supposedly only be performed by those who know the particular key used to encrypt. The key ostensibly consists of 64 bits; however, only 56 of these are actually used by the algorithm. Eight bits are used solely for checking parity, and are thereafter discarded. Hence the effective key length is 56 bits.

Triple DES (3DES) is a common name in cryptography for the Triple Data Encryption Algorithm (TDEA or Triple DEA) symmetric-key block cipher, which applies the Data Encryption Standard (DES) cipher algorithm three times to each data block. The original DES cipher's key size of 56-bits was generally sufficient when that algorithm was designed, but the availability of increasing computational power made brute-force attacks feasible. Triple DES provides a relatively simple method of increasing the key size of DES to protect against such attacks, without the need to design a completely new block cipher algorithm.

In FIG. 2, algorithms 202 and 204 transform data in separate records in storage memory back and forth between private data (P) and triple encrypted data (C).

FIGS. 3A, 3B, and 3C represent an algorithm 300 for cleaning up the raw data 106 in stored data records, field-by-field, record-by-record. What is meant by "cleaning up" is that inconsistent, missing, and illegal data in each field are removed or reconstituted. Some types of fields are very restricted in what is legal or allowed. A record 302 is fetched from the raw data 304 and for each field 306 a test 306 sees if the data value reported is numeric or symbolic. If numeric, a data dictionary 308 is used by a step 310 to see if such data value is listed as valid. If symbolic, another data dictionary 312 is used by a step 314 to see if such data value is listed as valid.

For numeric data values, a test 316 is used to branch if not numeric to a step 318 that replaces the numeric value. FIG. 3B illustrates such in greater detail. A test 320 is used to check if the numeric value is within an acceptable range. If not, step 318 is used to replace the numeric value.

For symbolic data values, a test 322 is used to branch if not numeric to a step 324 that replaces the symbolic value. FIG. 3C illustrates such in greater detail. A test 326 is used to check if the symbolic value is an allowable one. If yes, a step 328 checks if the value is allowed in a set. If yes, then a return 330 proceeds to the next field. If no, step 324 replaces the symbolic value.

If in step 326 the symbolic value in the field is not an allowed value, a step 332 asks if the present field is a zip code field. If yes, a step 334 asks if it's a valid zip code. If yes, the processing moves on to the next field with step 330. Otherwise, it calls on step 324 to replace the symbolic value.

If in step 332 the field is not an allowed value a zip code field, then a step 338 asks if the field is reserved for telephone and fax numbers. If yes, a step 340 asks if it's a valid telephone and fax number. If yes, the processing moves on to the next field with step 330. Otherwise, it calls on step 324 to replace the symbolic value.

If in step 338 the field is not a field reserved for telephone and fax numbers, then a step 344 asks if the present field is reserved for dates and time. If yes, a step 346 asks if it's a date or time. If yes, the processing moves on to the next field with step 330. Otherwise, it calls on step 324 to replace the symbolic value.

If in step 344 the field is not a field reserved for dates and time, then a step 350 applies a Smith-Waterman algorithm to the data value. The Smith-Waterman algorithm does a local-sequence alignment. It's used to determine if there are any similar regions between two strings or sequences. For example, to recognize "Avenue" as being the same as "Ave."; and "St." as the same as "Street"; and "Mr." as the same as "Mister". A consistent, coherent terminology is then enforceable in each data field without data loss. The Smith-Waterman algorithm compares segments of all possible lengths and optimizes the similarity measure without looking at the total sequence. Then the processing moves on to a next field with step 330.

FIG. 3B represents what happens inside step 318, replace numeric value. The numeric value to use as a replacement depends on any flags or preferences that were set to use a default, the average, a minimum, a maximum, or a null. A step 360 tests if user preferences were set to use a default value. If yes, then a step 361 sets a default value and returns to do a next field in step 330. A step 362 tests if user preferences were set to use an average value. If yes, then a step 361 sets an average value and returns to do the next field in step 330. A step 364 tests if user preferences were set to use a minimum value. If yes, then a step 361 sets a minimum value and returns to do the next field in step 330. A step 366 tests if user preferences were set to use a maximum value. If yes, then a step 361 sets a maximum value and returns to do the next field in step 330. A step 368 tests if user preferences were set to use a null value. If yes, then a step 361 sets a null value and returns to do the next field in step 330. Otherwise, a step 370 removes the record and moves on to the next record.

FIG. 3C represents what happens inside step 324, replace symbolic value. The symbolic value to use as a replacement depends on if flags were set to use a default, the average, or null. A step 374 tests if user preferences were set to use a default value. If yes, then a step 375 sets a default value and returns to do the next field in step 330. A step 376 tests if user preferences were set to use an average value. If yes, then a step 377 sets an average value and returns to do the next field in step 330. A step 378 tests if user preferences were set to use a null value. If yes, then a step 379 sets a null value and returns to do the next field in step 330. Otherwise, a step 380 removes the record and moves on to a next record.

FIG. 4 represents the apparatus for executing sampling algorithm 116. A sampling algorithm 400 takes cleaned, raw-data 402 and asks in step 404 if method embodiments of the present invention data are supervised. If so, a step 406 creates one data set "C1" 408 and a "Cn" 410 for each class. Stratified selection is used if needed. Each application carries its own class set, e.g., stocks portfolio managers use buy-sell-hold classes; loans managers use loan interest rate classes; risk assessment managers use fraud-no_fraud-suspicious classes; marketing managers use product-category-to-suggest classes; and, cybersecurity uses normal_behavior-abnormal_behavior classes. Other classes are possible and useful. For all classes, a step 412 and 413 asks if the class is abnormal (e.g., uncharacteristic). If not, a step 414 and 415 down-sample and produce sampled records of the class 416 and 417. Then a step 418 and 419 splits the remaining data into separate training sets 420 and 421, separate test sets 422 and 423, and separate blind sets 424 and 425.

If in step 404 method embodiments of the present invention data was determined to be unsupervised, a step 430 creates one data set with all the records and stores them in a memory device 432. A step 434 down-samples all of them and stores those in a memory device 436. Then a step 438 splits the remaining data into separate a training set 440, a separate test set 442, and a separate blind set 444.

Later applications described herein also require data cleanup and data enrichment, but they do not require the split training sets produced by sampling algorithm 400. Instead they process new incoming records that are cleaned and enriched to make a prediction, a score, or a decision, record one at a time.

Figure 5A:
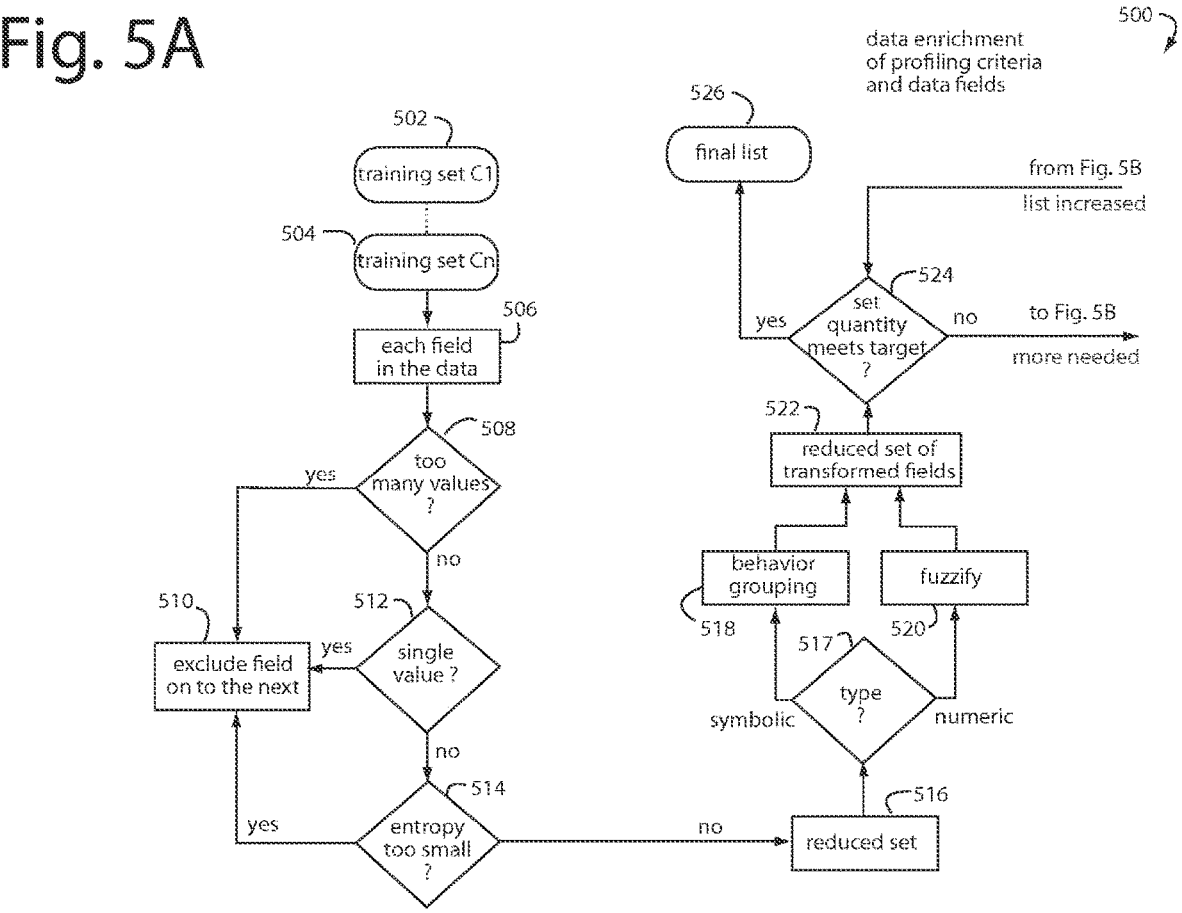
FIG. 5A is a flowchart diagram of an algorithm for a first part of the data enrichment as used in the method of FIG. 1.
Figure 5B:
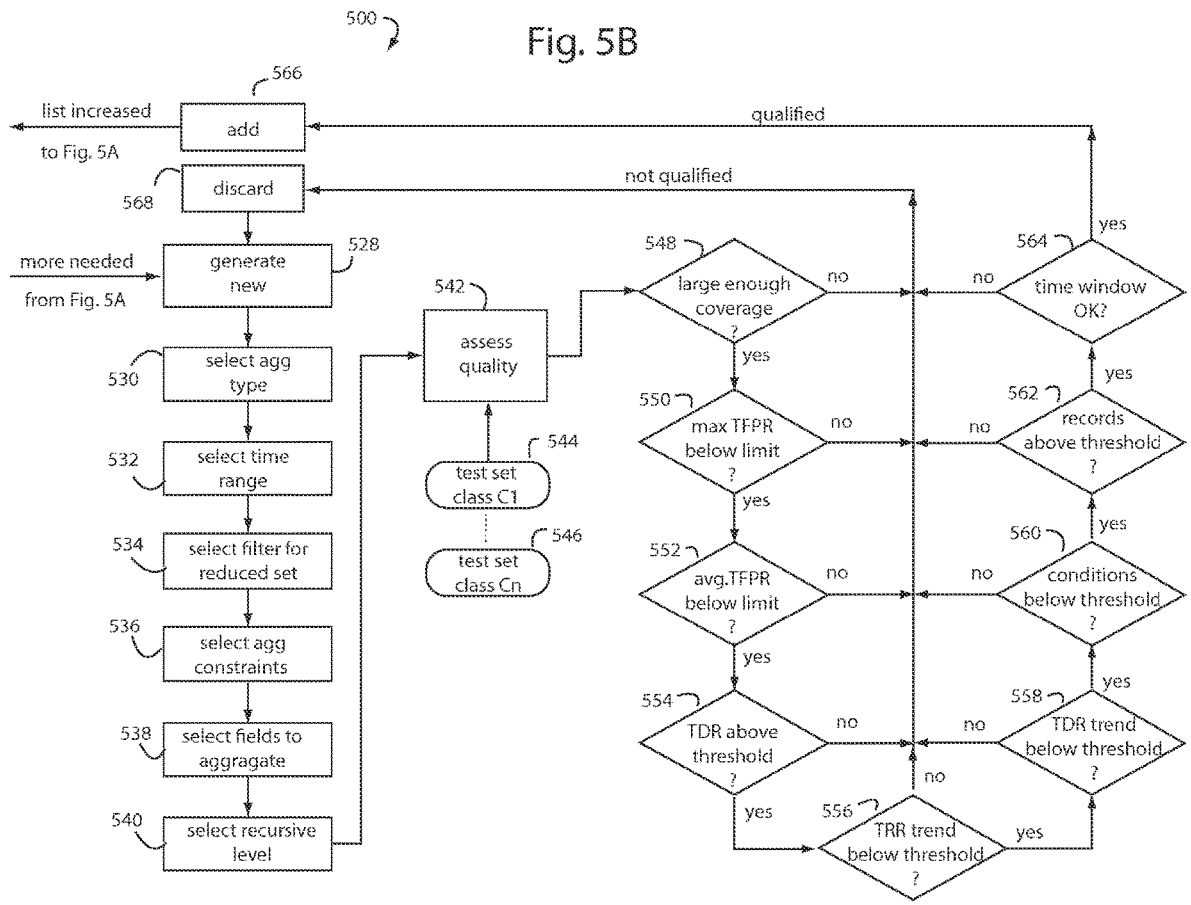
FIG. 5B is a flowchart diagram of an algorithm for a second part of the data enrichment as used in the method of FIG. 1 and where more derived fields are needed to suit quality targets.

FIGS. 5A and 5B together represent an apparatus 500 for executing a specialized data enrichment algorithm that works both to enrich the profiling criteria for smart-agents and to enrich the data fields for all the other general predictive models. They all are intended to work together in parallel with the smart-agents in operational use.

In FIG. 5A, a plurality of training sets, herein 502 and 502, for each class C1 . . . Cn are input for each data field of a record in a step 506. Such supervised and unsupervised training sets correspond to training sets 420, 421, and 440 (FIG. 4). More generally, flat data 110, 120 and sampled data 118 (FIG. 1). A step 508 asks if there are too many distinct data values. E.g., is the data scattered all over the map? If so, a step 510 excludes that field and thereby reduces the list of fields. Otherwise, a step 512 asks if there is a single data value. Again, if so such field is not too useful in later steps, and step 510 excludes that field as well. Otherwise, a step 514 asks if the Shannon entropy is too small. The entropy of a message is its amount of uncertainty. It increases when the message is closer to random, and decreases when it is less random. The idea here is that the less likely an event is, the more information it provides when it occurs. If the Shannon entropy is too small, step 510 excludes that field. Otherwise, a step 516 reduces the number of fields in the set of fields carried forward as those that actually provide useful information.

A step 517 asks if the field type under inspection at that instant is symbolic or numeric. If symbolic, a step 518 provides AI behavior grouping. For example, colors or the names of boys. Otherwise, a step 520 does a numeric fuzzification in which a numeric value is turned into a membership of one or more fuzzy sets. Then a step 522 produces a reduced set of transformed fields. A step 524 asks if the number of criteria or data fields remaining meets a predefined target number. The target number represents a judgment of the optimum spectrum of profiling criteria data fields that will be needed to produce high performance smart-agents and good predictive models.

If yes, a step 526 outputs a final list of profiling criteria and data fields needed by the smart-agent steps 126 and 127 in FIG. 1 and all the other predictive model steps 130, 131, 134, 135, 138, 139, 142, 143, 146, and 147.

If not, the later steps in Method 100 need richer data to work with than is on-hand at the moment. The enrichment provided represents the most distinctive advantage that embodiments of the present invention have over conventional methods and systems. A step 528 (FIG. 5B) begins a process to generate additional profiling criteria and newly derived data fields. A step 530 chooses an aggregation type. A step 532 chooses a time range for a newly derived field or profiling criteria. A step 534 chooses a filter. A step 536 chooses constraints. A step 538 chooses the fields to aggregate. A step 540 chooses a recursive level.

A step 542 assesses the quality of the newly derived field by importing test set classes C1 . . . Cn 544 and 546. It assesses the profiling criteria and data field quality for large enough coverage in a step 548, the maximum transaction/event false positive rate (TFPR) below a limit in a step 550, the average TFPR below a limit in a step 552, transaction/event detection rate (TDR) above a threshold in a step 554, the transaction/event review rate (TRR) trend below a threshold in a step 556, the number of conditions below a threshold in a step 560, the number of records is above a threshold in a step 562, and the time window is optimal a step 564.

If the newly derived profiling criteria or data field has been qualified, a step 566 adds it to the list. Otherwise, the newly derive profiling criteria or data field is discarded in a step 568 and returns to step 528 to try a new iteration with updated parameters.

Thresholds and limits are stored in computer storage memory mechanisms as modifiable digital data values that are non-transitory. Thresholds are predetermined and is "tuned" later to optimize overall operational performance. For example, by manipulating the data values stored in a computer memory storage mechanism through an administrator's console dashboard. Thresholds are digitally compared to incoming data, or newly derived data using conventional devices.

Using the Data Science

Once the predictive model technologies have been individually trained by both supervised and unsupervised data and then packaged into a PMML Document, one or more of them can be put to work in parallel render a risk or a decision score for each new record presented to them. At a minimum, only the smart-agent predictive model technology will be employed by a user-consumer. But when more than one predictive model technology is added in to leverage their respective synergies, a decision engine algorithm is needed to single out which predicted class produced in parallel by several predictive model technologies would be the best to rely on.

FIG. 6 is a flowchart diagram of a method 600 for using the PMML Documents (128, 132, 136, 140, 144, and 148) of FIG. 1 with an algorithm for the run-time operation of parallel predictive model technologies.

Method 600 depends on an apparatus to execute an algorithm to use the predictive technologies produced by method 100 (FIG. 1) and exported as PMML Documents. Method 600 can provide a substantial commercial advantage in a real-time, record-by-record application by a business. One or more PMML Documents 601-606 are imported and put to work in parallel as predictive model technologies 611-616 to simultaneously predict a class and its confidence in that class for each new record presented to them.

It is important that these records receive a data-cleanup 620 and a data-enrichment, as were described for steps 108 and 122 in FIG. 1. A resulting enriched data 624 with newly derived fields in the records is then passed in parallel for simultaneous consideration and evaluation by all the predictive model technologies 611-616 present. Each will transform its inputs into a predicted class 631-636 and a confidence 641-646 stored in a computer memory storage mechanism.

A record-by-record decision engine 650 inputs user strategies in the form of flag settings 652 and rules 654 to decision on which to output as a prevailing predicted class output 660 and to compute a normalized confidence output 661. Such record-by-record decision engine 650 is detailed here next in FIG. 7.

Typical examples of prevailing predicted classes 660:

| FIELD OF APPLICATION | OUTPUT CLASSES |
| --- | --- |
| stocks use class | buy, buy, sell, hold, etc. |
| loans use class | provide a loan with an interest, or not |
| risk use class | fraud, no fraud, suspicious |
| marketing use class | category of product to suggest |
| cybersecurity use class | normal behavior, abnormal, etc. |

Method 600 works with at least two of the predictive models from steps 128, 132, 136, 140, 144, and 148 (of FIG. 1). The predictive models each simultaneously produce a score and a score-confidence level in parallel sets, all from a particular record in a plurality of enriched-data records. These combine into a single result to return to a user-service consumer as a decision.

Further information related to combining models is included in Adjaoute '592. Special attention should be placed on FIG. 30 and the description in Column 22 on combining the technologies. There, the neural network, smart-agent, data mining, and case-based reasoning technologies all come together to produce a final decision, such as if a particular electronic transaction is fraudulent, in a different application, if there is network intrusion.

FIG. 7 is a flowchart diagram of an apparatus with an algorithm 700 for the decision engine 650 of FIG. 6. Algorithm 700 choses which predicted class 631-636, or a composite of them, should be output as prevailing predicted class 660. Switches or flag settings 652 are used to control the decision outcome and are fixed by the user-service consumer in operating their business based on the data science embodied in Documents 601-606. Rules 654 too can include business rules like, "always follow the smart agent's predicted class if its confidence exceeds 90%."

A step 702 inspects the rule type then in force. Compiled flag settings rules are fuzzy rules (business rules) developed with fuzzy logic. Fuzzy rules are used to merge the predicted classes from all the predictive models and technologies 631-636 and decide on one final prediction, herein, prevailing predicted class 660. Rules 654 are either manually written by analytical engineers, or they are automatically generated when analyzing the enriched training data 124 (FIG. 1) in steps 126, 130, 134, 138, 142, and 146.

If in step 702 it is decided to follow "compiled rules", then a step 704 invokes the compiled flag settings rules and returns with a corresponding decision 706 for output as prevailing predicted class 660.

If in step 702 it is decided to follow "smart agents", then a step 708 invokes the smart agents and returns with a corresponding decision 710 for output as prevailing predicted class 660.

If in step 702 it is decided to follow "predefined rules", then a step 712 asks if the flag settings should be applied first. If not, a step 714 applies a winner-take-all test to all the individual predicted classes 631-636 (FIG. 6). A step tests if one particular class wins. If yes, a step 718 outputs that winner class for output as prevailing predicted class 660.

If not in step 716, a step 720 applies the flag settings to the individual predicted classes 631-636 (FIG. 6). Then a step 722 asks there is a winner rule. If yes, a step 724 outputs that winner rule decision for output as prevailing predicted class 660. Otherwise, a step 726 outputs an "otherwise" rule decision for output as prevailing predicted class 660.

If in step 712 flag setting are to be applied first, a step 730 applies the flags to the individual predicted classes 631-636 (FIG. 6). Then a step 732 asks if there is a winner rule. If yes, then a step 734 outputs that winner rule decision for output as prevailing predicted class 660. Otherwise, a step 736 asks if the decision should be winner-take-all. If no, a step 738 outputs an "otherwise" rule decision for output as prevailing predicted class 660.

If in step 736 it should be winner-take-all, a step 740 applies winner-take-all to each of the individual predicted classes 631-636 (FIG. 6). Then a step 742 asks if there is now a winner class. If not, step 738 outputs an "otherwise" rule decision for output as prevailing predicted class 660. Otherwise, a step 744 outputs a winning class decision for output as prevailing predicted class 660.

Compiled flag settings rules in step 704 are fuzzy rules, e.g., business rules with fuzzy logic. Such fuzzy rules are targeted to merge the predictions 631-636 into one final prediction 660. Such rules are either written by analytical engineers or are generated automatically by analyses of the training data.

Figure 8:
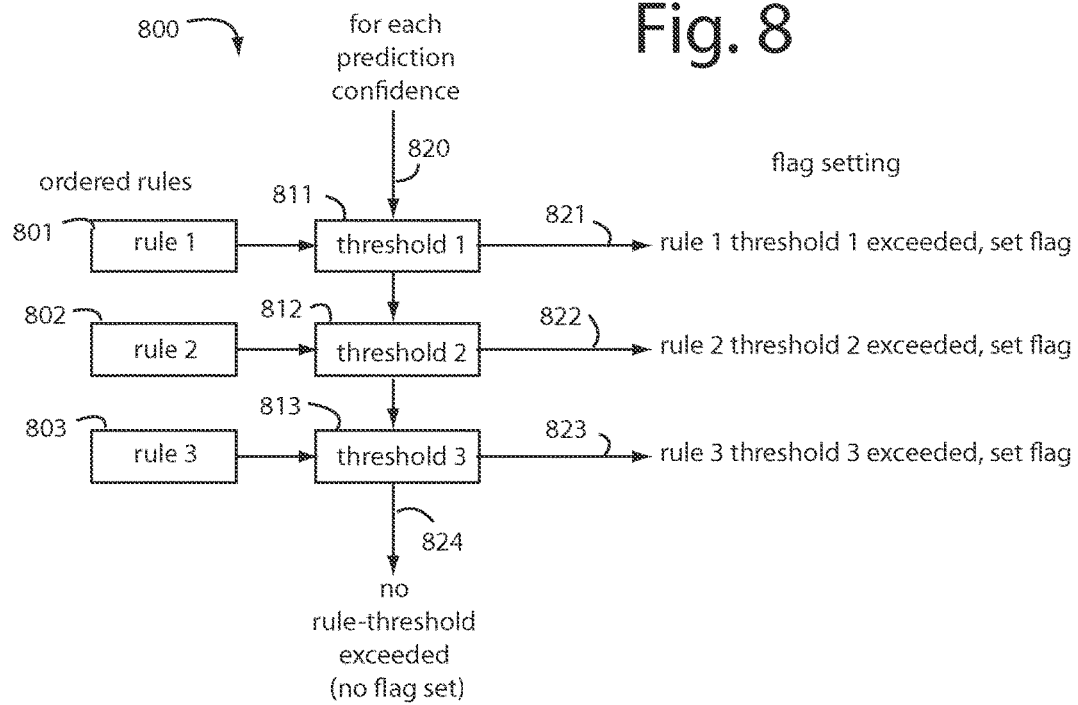
FIG. 8 is a flowchart diagram of an algorithm for using ordered rules and thresholds to decide amongst prediction classes.

When applying flag settings to the individual predictions, as in step 730, an algorithm for a set of ordered rules that indicate how to handle predictions output by each prediction technology. FIG. 8 illustrates this further.

FIG. 8 shows flag settings 800 as a set of ordered rules 801-803 that indicate how to handle each technology prediction 631-636 (FIG. 6). For each technology 611-616, there is at least one rule 801-803 that provides a corresponding threshold 811-813. Each are then compared to prediction confidences 641-646.

When a corresponding incoming confidence 820 is higher or equal to a given threshold 811-813 provided by a rule 801-803, the technology 611-616 associated with rule 801-803 is declared "winner" and its class and confidence are used as the final prediction. When none of the technologies 611-616 win, an "otherwise rule" determines what to do. In this case, a clause indicates how to classify the transaction (fraud/not-fraud) and it sets the confidence to zero. Consider the following example:

| Predictions | | |
|---|---|---|
| Class | Prediction Technology | Confidence |
| Fraud | Smart-agents | 0.7 |
| Fraud | Data Mining | 0.8 |
| , , , | . . . | . . . |

| Flags Settings | | |
|---|---|---|
| Prediction Type | Prediction Technology | Threshold |
| All | Smart-agents | 0.75 |
| All | Data Mining | 0.7 |
| . . . | . . . | . . . |

A first rule, e.g., 801, looks at a smart-agent confidence (e.g., 641) of 0.7, but that is below a given corresponding threshold (e.g., 811) of 0.75 so inspection continues.

A second rule (e.g., 802) looks at a data mining confidence (e.g., 642) of 0.8 which is above a given threshold (e.g., 812) of 0.7. Inspection stops here and decision engine 650 uses the Data Mining prediction (e.g., 632) to define the final prediction (e.g., 660). Thus it is decided in this example that the incoming transaction is fraudulent with a confidence of 0.8.

It is possible to define rules that apply only to specific kinds of predictions. For example, a higher threshold is associated with predictions of fraud, as opposed to prediction classes of non-frauds.

A winner-take-all technique groups the individual predictions 631-636 by their prediction output classes. Each Prediction Technology is assigned its own weight, one used when it predicts a fraudulent transaction, another used when it predicts a valid transaction. All similar predictions are grouped together by summing their weighted confidence. The sum of the weighted confidences is divided by the sum of the weights used in order to obtain a final confidence between 0.0 and 1.0.

For example:

| Weights | | |
|---|---|---|
| Prediction Technology | Weight - Fraud | Weight - Valid |
| Smart-agents | 2 | 2 |
| Data Mining | 1 | 1 |
| Case Based Reasoning | 2 | 2 |

| Predictions | | |
|---|---|---|
| Class | Prediction Technology | Confidence |
| Fraud | Smart-agents | 0.7 |
| Fraud | Data Mining | 0.8 |
| Valid | Cases Based Reasoning | 0.4 |

Here in the Example, two prediction technologies (e.g., 611 and 612) are predicting (e.g., 631 and 632) a "fraud" class for the transaction. So their cumulated weighted confidence here is computed as: 2*0.7+1*0.8 which is 2.2, and stored in computer memory. Only case-based-reasoning (e.g., 614) predicts (e.g., class 634) a "valid" transaction, so its weighted confidence here is computed as: 1*0.4, and is also stored in computer memory for comparison later.

Since the first computed value of 2.2 is greater than the second computed value of 0.4, this particular transaction in this example is decided to belong to the "fraud" class. The confidence is then normalized for output by dividing it by the sum of the weights that where associated with the fraud (2 and 1). So the final confidence (e.g., 661) is computed by 2.2/(2+1) giving: 0.73.

Some models 611-616 may have been trained to output more than just two binary classes. A fuzzification can provide more than two slots, e.g., for buy/sell/hold, or declined/suspect/approved. It may help to group classes by type of prediction (fraud or not-fraud).

For example:

| Weights | | |
|---|---|---|
| Prediction Technology | Weight - Fraud | Weight - Valid |
| Smart-agents | 2 | 2 |
| Data Mining | 1 | 1 |
| Cases Based Reasoning | 2 | 2 |

| Predictions | | |
|---|---|---|
| Class | Prediction Technology | Confidence |
| 00 | Smart-agents | 0.6 |
| 01 | Data Mining | 0.5 |
| G | Cases Based Reasoning | 0.7 |

| Classes | |
|---|---|
| Value | Type |
| 00 | Fraud |
| 01 | Fraud |
| G | Valid |

In a first example, similar classes are grouped together. So fraud=2*0.6+1*0.5=1.7, and valid=2*0.7=1.4. The transaction in this example is marked as fraudulent.

In a second example, all the classes are distinct, with the following equation: 2*0.6 "00"+1*0.5 "01"+2*0.7 "G" so the winner is the class "G" and the transaction is marked as valid in this example.

Embodiments of the present invention integrate the constituent opinions of the technologies and make a single prediction class. How they integrate the constituent predictions 631-636 depend on a user-service consumers' selections of which technologies to favor and how to favor, and such selections are made prior to training the technologies, e.g., through a model training interface.

A default selection includes the results of the neural network technology, the smart-agent technology, the data mining technology, and the case-based reasoning technology. Alternatively, the user-service consumer may decide to use any combination of technologies, or to select an expert mode with four additional technologies: (1) rule-based reasoning technology; (2) fuzzy logic technology; (3) genetic algorithms technology; and (4) constraint programming technology.

One strategy that could be defined by a user-service consumer-consumer assigns one vote to each predictive technology 611-616. A final decision 660 then stems from a majority decision reached by equal votes by the technologies within decision engine 650.

Another strategy definable by a user-service consumer-consumer assigns priority values to each one of technologies 611-616 with higher priorities that more heavily determine the final decision, e.g., that a transaction is fraudulent and another technology with a lower priority determines that the transaction is not fraudulent, then method embodiments of the present invention use the priority values to discriminate between the results of the two technologies and determine that the transaction is indeed fraudulent.

A further strategy definable by a user-service consumer-consumer specifies instead a set of meta-rules to help choose a final decision 660 for output. These all indicate an output prediction class and its confidence level as a percentage (0-100%, or 0-1.0) proportional to how confident the system apparatus is in the prediction.

FIG. 9 illustrates a method 900 of business decision making that requires the collaboration of two businesses, a service provider 901 and a user-consumer 902. The two businesses communicate with one another via secure Internet between network servers. The many data records and data files passed between them are hashed or encrypted by a triple-DES algorithm, or similar protection. It also possible to send a non-encrypted filed through an encrypted channel. Users of the platform would upload their data through SSL/TLS from a browser or from a command line interface (SCP or SFTP).

The service-provider business 901 combines method 100 (FIG. 1) and method 600 (FIG. 6) and their constituent algorithms. It accepts supervised and unsupervised training data 904 and strategies 906 from the user-service consumer business 902. Method 100 then processes such as described above with FIGS. 1-8 to produce a full set of fully trained predictive models that are passed to method 600.

New records from operations 906 provided, e.g., in real-time as they occur, are passed after being transformed by encryption from the user-service consumer business 902 to the service provider business 901 and method 600. An on-going run of scores, predictions, and decisions 908 (produced by method 600 according to the predictive models of method 100 and the strategies 905 and training data 904) are returned to user-service consumer business 902 after being transformed by encryption.

With some adjustment and reconfiguration, method 900 is trained for a wide range of uses, e.g., to classify fraud/no-fraud in payment transaction networks, to predict buy/sell/hold in stock trading, to detect malicious insider activity, and to call for preventative maintenance with machine and device failure predictions.

Figure 10:
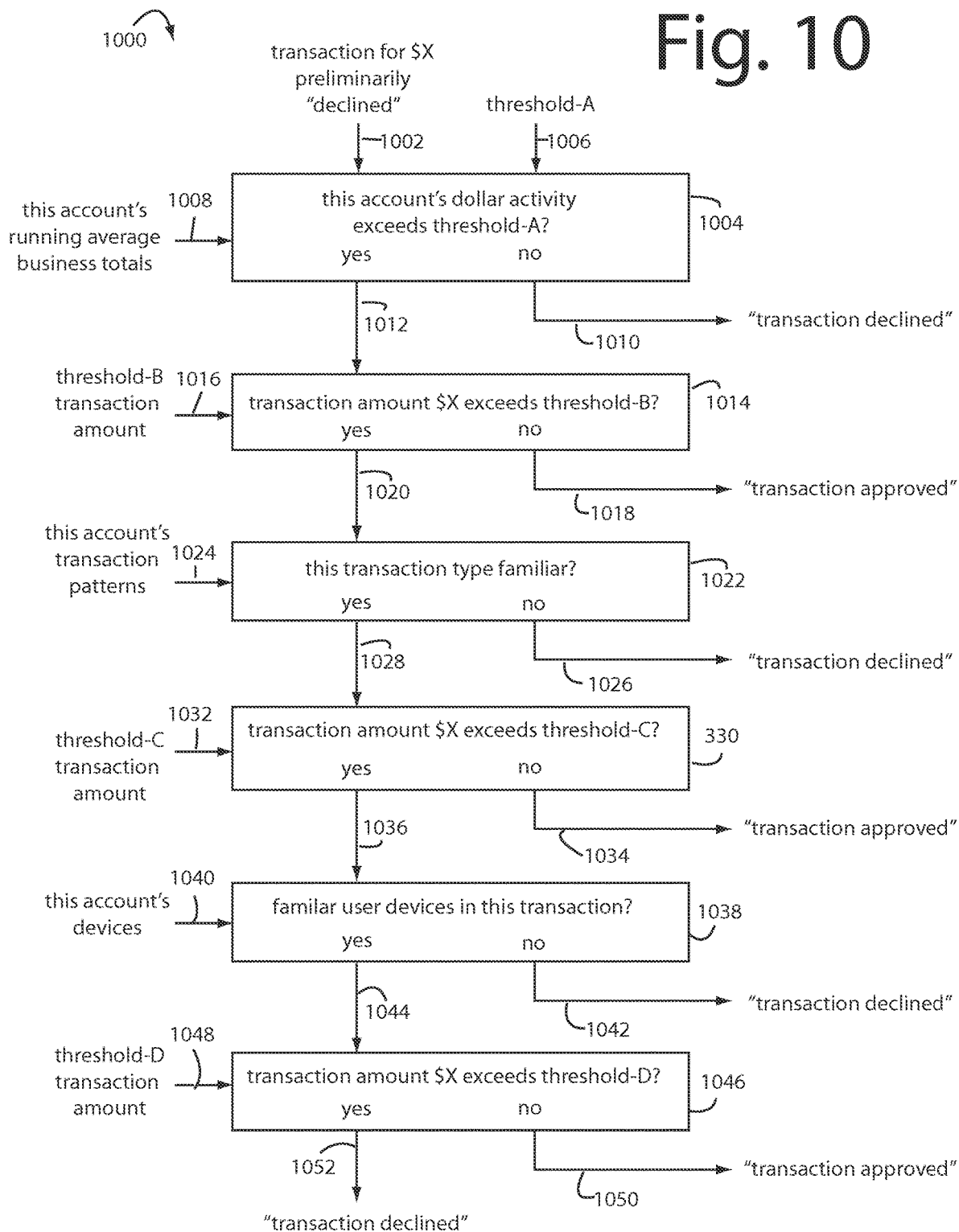
FIG. 10 is a flowchart diagram illustrating an apparatus for executing an algorithm for reconsideration of an otherwise final adverse decision, for example, in an authorization system a transaction request for a particular amount $X has already been preliminarily "declined" according to some other scoring model.

FIG. 10 represents an apparatus for executing an algorithm 1000 for reclassifying a decision 660 (FIG. 6) for business profitability reasons. For example, when a payment transaction for a particular transaction amount $X has already been preliminarily "declined" and included in a decision 1002 (and 660, FIG. 6) according to some other scoring model. A test 1004 compares a dollar transaction "threshold amount-A" 1006 to a computation 1008 of the running average business a particular user has been doing with the account involved. The rational for doing this is that valuable customers who do more than an average amount (threshold-A 1006) of business with their payment should not be so easily or trivially declined. Some artificial intelligence deliberation and reconsideration is appropriate.

If, however test 1004 decides that the accountholder has not earned special processing, a "transaction declined" decision 1010 is issued as final. Such is then forwarded by a financial network to the merchant point-of-sale (POS).

But when test 1004 decides that the accountholder has earned special processing, a transaction-preliminarily-approved decision 1012 is carried forward to a test 1014. A threshold-B transaction amount 1016 is compared to the transaction amount $X. Essentially, threshold-B transaction amount 1016 is set at a level that would relieve qualified accountholders of ever being denied a petty transaction, e.g., under $250, and yet not involve a great amount of risk should the "positive" scoring indication from the "other scoring model" not prove much later to be "false". If the transaction amount $X is less than threshold-B transaction amount 1016, a "transaction approved" decision 1018 is issued as final. Such is then forwarded by the financial network to the merchant CP/CNP, unattended terminal, ATM, online payments, etc.

If the transaction amount $X is more than threshold-B transaction amount 1016, a transaction-preliminarily-approved decision 1020 is carried forward to a familiar transaction pattern test 1022. An abstract 1024 of this account's transaction patterns is compared to the instant transaction. For example, if this accountholder seems to be a new parent with a new baby as evidenced in purchases of particular items, then all future purchases that could be associated are reasonably predictable. Or, in another example, if the accountholder seems to be on business in a foreign country as evidenced in purchases of particular items and travel arrangements, then all future purchases that could be reasonably associated are to be expected and scored as lower risk. And, in one more example, if the accountholder seems to be a professional gambler as evidenced in cash advances at casinos, purchases of specific things and arrangements, then these future purchases too could be reasonably associated are be expected and scored as lower risk.

So if the transaction type is not a familiar one, then a "transaction declined" decision 1026 is issued as final. Such is then forwarded by the financial network to the merchant (CP and/or CNP) and/or unattended terminal/ATM. Otherwise; a transaction-preliminarily-approved decision 1028 is carried forward to a threshold-C test 1030.

A threshold-C transaction amount 1032 is compared to the transaction amount $X. Essentially, threshold-C transaction amount 1032 is set at a level that would relieve qualified accountholders of being denied a moderate transaction, e.g., under $2500, and yet not involve a great amount of risk because the accountholder's transactional behavior is within their individual norms. If the transaction amount $X is less than threshold-C transaction amount 1032, a "transaction approved" decision 1034 is issued as final (transaction-approved). Such is then forwarded by the financial network to the merchant (CP and/or CNP) and/or unattended terminal/ATM.

If the transaction amount $X is more than threshold-C transaction amount 1032, a transaction-preliminarily-approved decision 1036 is carried forward to a familiar user device recognition test 1038. An abstract 1040 of this account's user devices is compared to those used in the instant transaction.

So if the user device is not recognizable as one employed by the accountholder, then a "transaction declined" decision 1042 is issued as final. Such is then forwarded by the financial network to the merchant (CP and/or CNP) and/or unattended terminal/ATM. Otherwise; a transaction-preliminarily-approved decision 1044 is carried forward to a threshold-D test 1046.

A threshold-D transaction amount 1048 is compared to the transaction amount $X. Basically, the threshold-D transaction amount 1048 is set at a higher level that would avoid denying substantial transactions to qualified accountholders, e.g., under $10,000, and yet not involve a great amount of risk because the accountholder's user devices are recognized and their instant transactional behavior is within their individual norms. If the transaction amount $X is less than threshold-D transaction amount 1032, a "transaction approved" decision 1050 is issued as final. Such is then forwarded by the financial network to the merchant (CP and/or CNP) and/or unattended terminal/ATM.

Otherwise, the transaction amount $X is just too large to override a denial if the other scoring model decision 1002 was "positive", e.g., for fraud, or some other reason. In such case, a "transaction declined" decision 1052 is issued as final. Such is then forwarded by the financial network to the merchant (CP and/or CNP) and/or unattended terminal/ATM.

In general, threshold-B 1016 is less than threshold-C 1032, which in turn is less than threshold-D 1048. It could be that tests 1022 and 1038 would serve profits better if swapped in FIG. 10. Embodiments of the present invention would therefore include this variation as well. It would seem that threshold-A 1006 should be empirically derived and driven by business goals.

The further data processing required by technology 1000 occurs in real-time while merchant (CP and CNP, ATM and all unattended terminal) and users wait for approved/declined data messages to arrive through financial network. The consequence of this is that the abstracts for this-account's-running-average-totals 1008, this account's-transaction-patterns 1024, and this-account's-devices 1040 must all be accessible and on-hand very quickly. A simple look-up is preferred to having to compute the values. The smart agents and the behavioral profiles they maintain and that we've described in this Application and those we incorporate herein by reference are up to doing this job well. Conventional methods and apparatus may struggle to provide this information quickly enough.

FIG. 10 represents for the first time in machine learning an apparatus that allows a different threshold for each customer. It further enables different thresholds for the same customer based on the context, e.g., a Threshold-1 while traveling, a Threshold-2 while buying things familiar with his purchase history, a Threshold-3 while in same area where they live, a Threshold-4 during holidays, a Threshold-5 for nights, a Threshold-6 during business hours, etc.

FIG. 11 represents an algorithm that executes as smart-agent production apparatus 1100, and is included in the build of smart-agents in steps 126 and 127 (FIG. 1), or as step 611 (FIG. 6) in operation. The results are either exported as an .IFM-type XML document in step 128, or used locally as in method 600 (FIG. 6). Step 126 (FIG. 1) builds a population of smart-agents and their profiles that are represented in FIG. 11 as smart-agents S1 1102 and Sn 1104. Step 127 (FIG. 1) initialized that build. Such population can reach into the millions for large systems, e.g., those that handle payment transaction requests nationally and internationally for millions of customers (entities).

Each new record 1106 received, from training records 124, or from data enrichment 622 in FIG. 6, is inspected by a step 1108 that identifies the entity unique to the record that has caused to record to be generated. A step 1110 gets the corresponding smart-agent that matches this identification from the initial population of smart-agents 1102, 1102 it received in step 128 (FIG. 1). A step 1112 asks if any were not found. A step 1114 uses default profiles optimally defined for each entity, and to create and initialize smart-agents and profiles for entities that do not have a match in the initial population of smart-agents 1102, 1102. A step 1116 uses the matching smart-agent and profile to assess record 1106 and issues a score 1118. A step 1120 updates the matching smart-agent profile with the new information in record 1106.

A step 1122 dynamically creates/removes/updates and otherwise adjusts attributes in any matching smart-agent profile based on a content of records 1106. A step 1124 adjusts an aggregation type (count, sum, distinct, ratio, average, minimum, maximum, standard deviation, . . . ) in a matching smart-agent profile. A step 1126 adjusts a time range in a matching smart-agent profile. A step 1128 adjusts a filter based on a reduced set of transformed fields in a matching smart-agent profile. A step 1130 adjusts a multi-dimensional aggregation constraint in a matching smart-agent profile. A step 1132 adjusts an aggregation field, if needed, in the matching smart-agent profile. A step 1134 adjusts a recursive level in the matching smart-agent profile.

FIGS. 12-29 provide greater detail regarding the construction and functioning of algorithms that are employed in FIGS. 1-11.

Neural Network Technology

Figure 12:
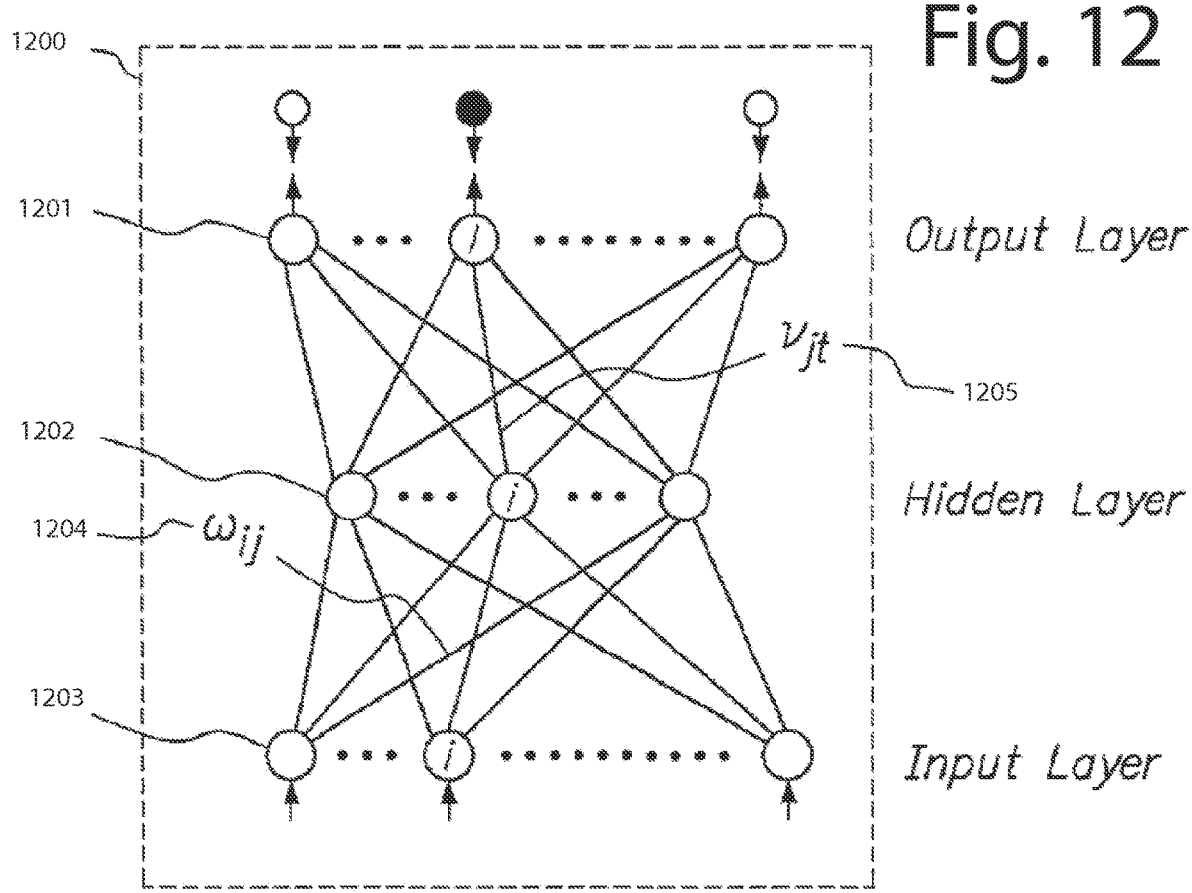

FIG. 12 is a schematic diagram of the neural network architecture used in method embodiments of the present invention. Neural network 1200 consists of a set of processing elements or neurons that are logically arranged into three layers: (1) input layer 1201; (2) output layer 1202; and (3) hidden layer 1203. The architecture of neural network 1200 is similar to a back propagation neural network, but its training, utilization, and learning algorithms are different. The neurons in input layer 1201 receive input fields from a training table. Each of the input fields are multiplied by a weight such as weight "Wij" 1204 a to obtain a state or output that is passed along another weighted connection with weights "Vjt" 1205 between neurons in hidden layer 1202 and output layer 1203. The inputs to neurons in each layer come exclusively from output of neurons in a previous layer, and the output from these neurons propagate to the neurons in the following layers.

Figure 13:
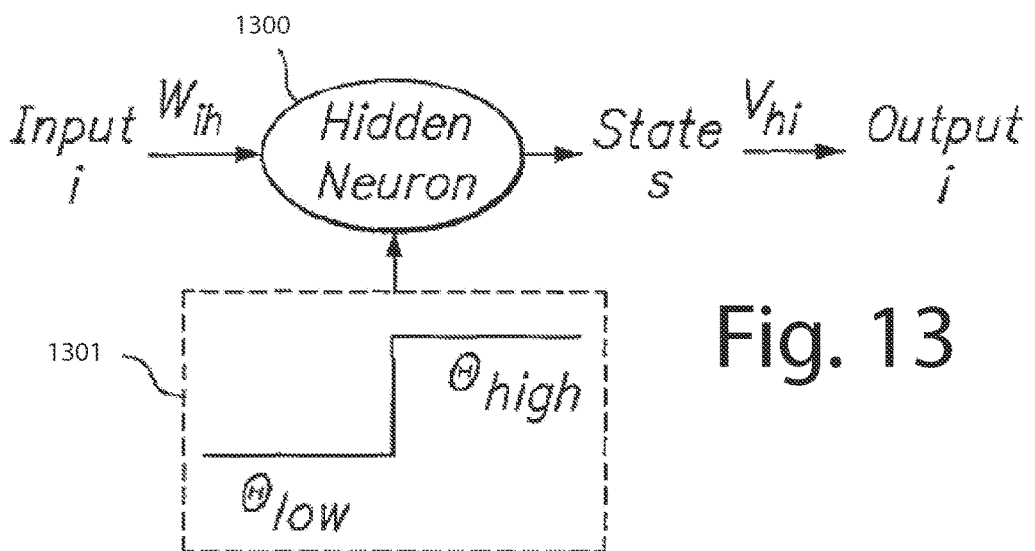

FIG. 13 is a diagram of a single neuron in the neural network used in method embodiments of the present invention. Neuron 1300 receives input "i" from a neuron in a previous layer. Input "i" is multiplied by a weight "Wih" and processed by neuron 1300 to produce state "s". State "s" is then multiplied by weight "V," to produce output "i" that is processed by neurons in the following layers. Neuron 1300 contains limiting thresholds 1301 that determine how an input is propagated to neurons in the following layers.

Figure 14:
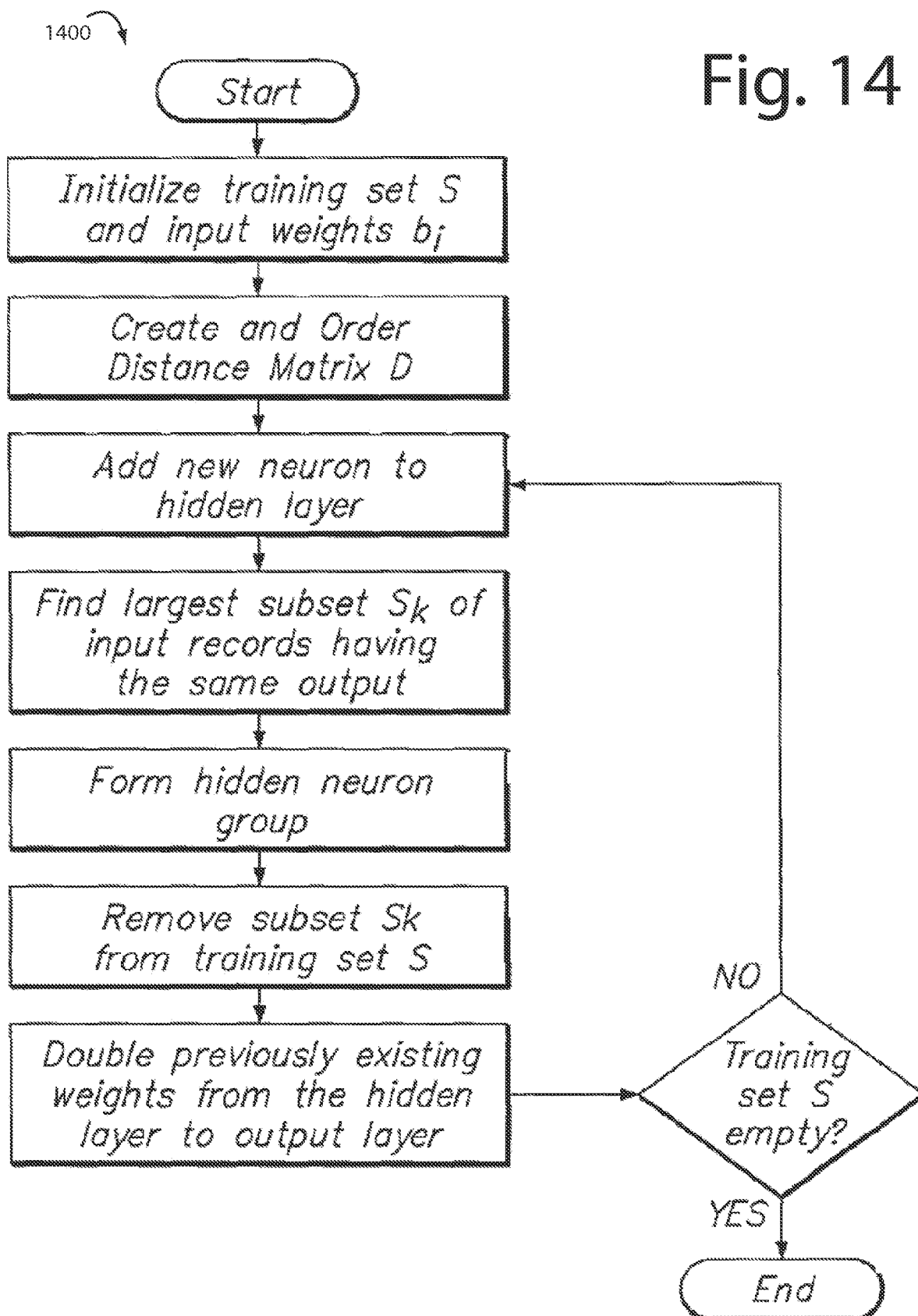

FIG. 14 is a flowchart of an algorithm 1400 for training neural networks with a single hidden layer that builds incrementally during a training process. The hidden layers may also grow in number later during any updates. Each training process computes a distance between all the records in a training table, and groups some of the records together. In a first step, a training set "S" and input weights "bi" are initialized. Training set "S" is initialized to contain all the records in the training table. Each field "i" in the training table is assigned a weight "bi" to indicate its importance. The input weights "bi" are selected by a client. A distance matrix D is created. Distance matrix D is a square and symmetric matrix of size N×N, where N is the total number of records in training set "S". Each element "Dij" in row "i" and column "j" of distance matrix D contains the distance between record "i" and record "j" in training set "S". The distance between two records in training set "S" is computed using a distance measure.

Figures 15, 21:
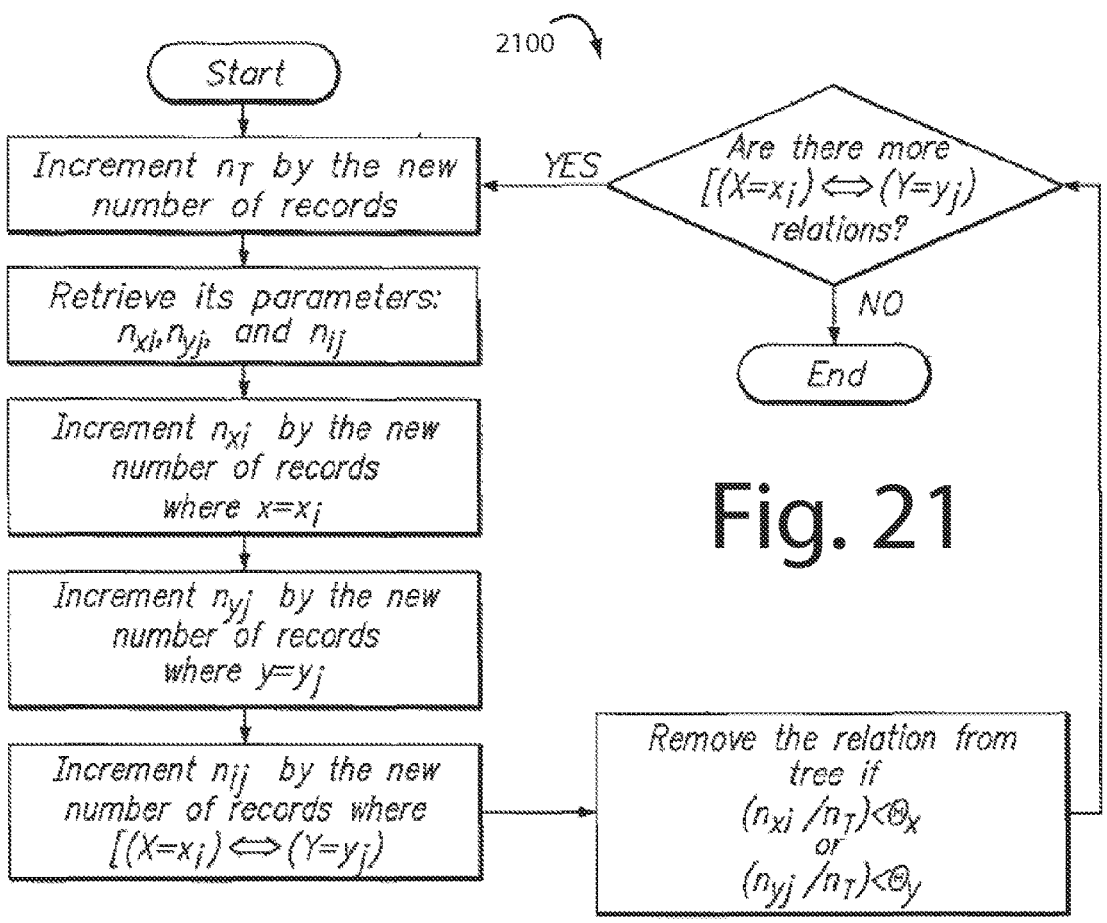

FIG. 15 illustrates a table of distance measures 1500 that is used in a neural network training process. Table 1500 lists distance measures that is used to compute the distance between two records Xi and Xj in training set "S". The default distance measure used in the training process is a Weighted-Euclidean distance measure that uses input weights "bi" to assign priority values to the fields in a training table.

In FIG. 14, a distance matrix D is computed such that each element at row "i" and column "j" contains d(Xi,Xj) between records Xi and Xj in training set "S". Each row "i" of distance matrix D is then sorted so that it contains the distances of all the records in training set "S" ordered from the closest one to the farthest one.

A new neuron is added to the hidden layer of the neural network the largest subset "Sk" of input records having the same output is determined. Once the largest subset "Sk" is determined, the neuron group is formed at step 97. The neuron group consists of two limiting thresholds, θlow and θhigh, input weights "Wh", and output weights "Vh", such that θlow=Dk, "j" and θhigh=Dk,l, where "k" is the row in the sorted distance matrix D that contains the largest subset "Sk" of input records having the same output, "j" is the index of the first column in the subset "Sk" of row "k", and l is the index of the last column in the subset "Sk" of row "k". The input weights "Wh" are equal to the value of the input record in row "k" of the distance matrix D, and the output weights "Vh" are equal to zero except for the weight assigned between the created neuron in the hidden layer and the neuron in the output layer representing the output class value of any records belonging to subset "Sk". A subset "Sk" is removed from training set "S", and all the previously existing output weights "Vh" between the hidden layer and the output layer are doubled. Finally, the training set is checked to see if it still contains input records, and if so, the training process goes back. Otherwise, the training process is finished and the neural network is ready for use.

Figure 16:
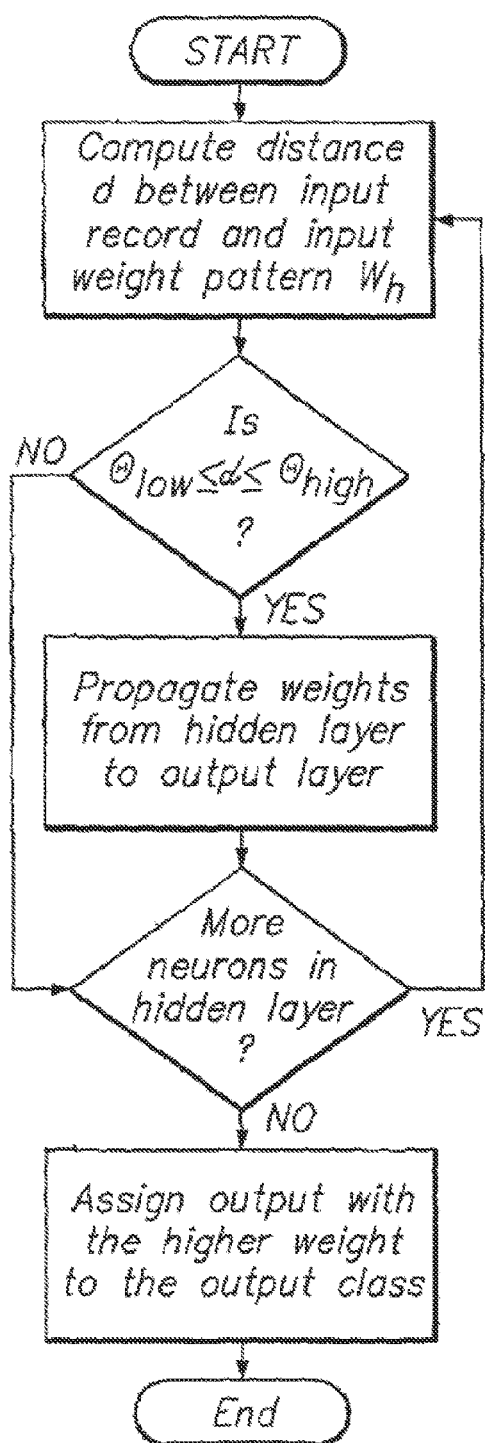

FIG. 16 is a flowchart of an algorithm 1600 for propagating an input record through a neural network. An input record is propagated through a network to predict if its output signifies a fraudulent transaction. A distance between the input record and the weight pattern "Wh" between the input layer and the hidden layer in the neural network is computed. The distance "d" is compared to the limiting thresholds low and high of the first neuron in the hidden layer. If the distance is between the limiting thresholds, then the weights "Wh" are added to the weights "Vh" between the hidden layer and the output layer of the neural network. If there are more neurons in the hidden layer, then the propagation algorithm goes back to repeat steps for the other neurons in the hidden layer. Finally, the predicted output class is determined according to the neuron at the output layer that has the higher weight.

Figure 17:
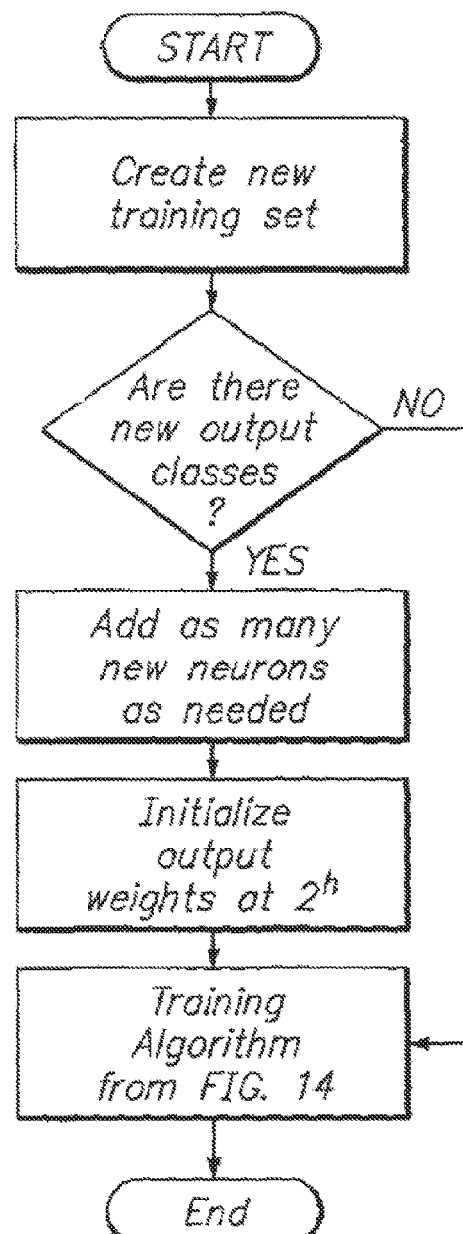

FIG. 17 is a flowchart of an algorithm 1700 for updating the training process of a neural network. The training process is updated whenever a neural network needs to learn some new input record. Neural networks are updated automatically, as soon as data from a new record is evaluated by method embodiments of the present invention. Alternatively, the neural network may be updated offline.

A new training set for updating a neural network is created. The new training set contains all the new data records that were not utilized when first training the network using the training algorithm illustrated in FIG. 14. The training set is checked to see if it contains any new output classes not found in the neural network. If there are no new output classes, the updating process proceeds with the training algorithm illustrated in FIG. 14. If there are new output classes, then new neurons are added to the output layer of the neural network, so that each new output class has a corresponding neuron at the output layer. When the new neurons are added, the weights from these neurons to the existing neurons at the hidden layer of the neural network are initialized to zero. The weights from the hidden neurons to be created during the training algorithm are initialized as $2h$, where "h" is the number of hidden neurons in the neural network prior to the insertion of each new hidden neuron. With this initialization, the training algorithm illustrated in FIG. 14 is started to form the updated neural network technology.

Evaluating if a given input record belongs to one class or other is done quickly and reliably with the training, propagation, and updating algorithms described.

Smart-Agent Technology

Smart-agent technology uses multiple smart-agents in unsupervised mode, e.g., to learn how to create profiles and clusters. Each field in a training table has its own smart-agent that cooperates with others to combine some partial pieces of knowledge they have about data for a given field, and validate the data being examined by another smart-agent. The smart-agents can identify unusual data and unexplained relationships. For example, by analyzing a healthcare database, the smart-agents would be able to identify unusual medical treatment combinations used to combat a certain disease, or to identify that a certain disease is only linked to children. The smart-agents would also be able to detect certain treatment combinations just by analyzing the database records with fields such as symptoms, geographic information of patients, medical procedures, and so on.

Smart-agent technology creates intervals of normal values for each one of the fields in a training table to evaluate if the values of the fields of a given electronic transaction are normal. And the technology determines any dependencies between each field in a training table to evaluate if the values of the fields of a given electronic transaction or record are coherent with the known field dependencies. Both goals can generate warnings.

Figure 18:
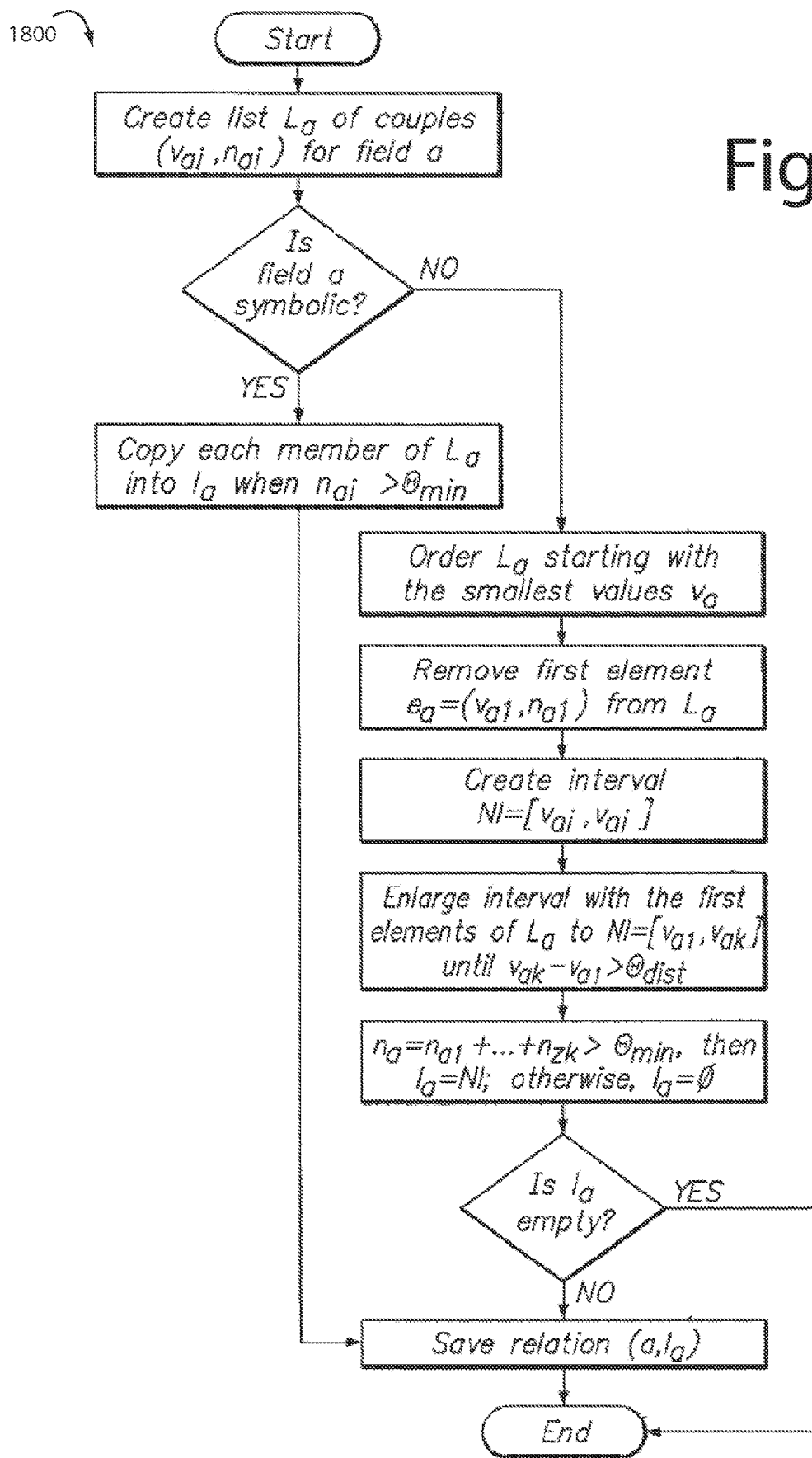

FIG. 18 is a flowchart of an algorithm for creating intervals of normal values for a field in a training table. The algorithm illustrated in the flowchart is run for each field "a" in a training table. A list "La" of distinct couples ("vai", "nai") is created, where "vai" represents the $i^{th}$ distinct value for field "a" and "nai" represents its cardinality, e.g., the number of times value "vai" appears in a training table. At step 119, the field is determined to be symbolic or numeric. If the field is symbolic, each member of "La" is copied into a new list "Ia" whenever "nai" is superior to a threshold "θmin" that represents the minimum number of elements a normal interval must include. "θmin" is computed as "θmin"=fmin* M, where M is the total number of records in a training table and fmin is a parameter specified by the user representing the minimum frequency of values in each normal interval. Finally, the relations (a,Ia) are saved in memory storage. Whenever a data record is to be evaluated by the smart-agent technology, the value of the field "a" in the data record is compared to the normal intervals created in "Ia" to determine if the value of the field "a" is outside the normal range of values for that given field.

If the field "a" is determined to be numeric, then the list "La" of distinct couples ("vai",nai) is ordered starting with the smallest value Va. At step 122, the first element e=(val, nal) is removed from the list "La", and an interval NI=[val, val] is formed. At step 124, the interval NI is enlarged to NI=[Val,vak] until Vak−Val>θdist, where θdist represents the maximum width of a normal interval. θdist is computed as θdist=(maxa−mina)/nmax, where nmax is a parameter specified by the user to denote the maximum number of intervals for each field in a training table. The values that are too dissimilar are not grouped together in the same interval.

The total cardinality "na" of all the values from "val" to "vak" is compared to "θmin" to determine the final value of the list of normal intervals "Ia". If the list "Ia" is not empty, the relations (a,Ia) are saved. Whenever a data record is to be evaluated by the smart-agent technology, the value of the field "a" in the data record is compared to the normal intervals created in "Ia" to determine if the value of the field "a" is outside the normal range of values for that given field. If the value of the field "a" is outside the normal range of values for that given field, a warning is generated to indicate that the data record is likely fraudulent.

FIG. 19 is a flowchart of an algorithm 1900 for determining dependencies between each field in a training table. A list Lx of couples (vxi,nxi) is created for each field "x" in a training table. The values vxi in Lx for which (nxi/nT)>θx are determined, where nT is the total number of records in a training table and θx is a threshold value specified by the user. In a preferred embodiment, ex has a default value of 1%. At step 132, a list Ly of couples (vyi,nyi) for each field y, Y≠X, is created. The number of records nij where (x=xi) and (y=yj) are retrieved from a training table. If the relation is significant, that is if (nij/nxi)>θxy, where θxy is a threshold value specified by the user when the relation (X=xi)⇔(Y=yj) is saved with the cardinalities nxi, nyj, and nij, and accuracy (nij/nxi). In a preferred embodiment, θxy has a default value of 85%.

All the relations are saved in a tree made with four levels of hash tables to increase the speed of the smart-agent technology. The first level in the tree hashes the field name of the first field, the second level hashes the values for the first field implying some correlations with other fields, the third level hashes the field name with whom the first field has some correlations, and finally, the fourth level in the tree hashes the values of the second field that are correlated with the values of the first field. Each leaf of the tree represents a relation, and at each leaf, the cardinalities nxi, nyj, and nij are stored. This allows the smart-agent technology to be automatically updated and to determine the accuracy, prevalence, and the expected predictability of any given relation formed in a training table.

FIG. 20 is a flowchart of an algorithm 2000 for verifying the dependencies between the fields in an input record. For each field "x" in the input record corresponding to an electronic transaction, the relations starting with [(X=xi)⇔ . . . ] are found in the smart-agent technology tree. For all the other fields "y" in a transaction, the relations [(X=xi)⇔(Y=v)] are found in the tree. A warning is triggered anytime Yj≠V. The warning indicates that the values of the fields in the input record are not coherent with the known field dependencies, which is often a characteristic of fraudulent transactions.

FIG. 21 is a flowchart of an algorithm 2100 for updating smart-agents. The total number of records nT in a training table is incremented by a new number of input records to be included in the update of the smart-agent technology. For the first relation (X=xi)⇔(Y=yj) previously created in the technology, the parameters nxi, nyj, and nij are retrieved, and, nxi, nyj, and nij are respectively incremented. The relation is verified to see if it is still significant for including it in a smart-agent tree. If the relation is not significant, then it is removed from the tree. Finally, a check is performed to see if there are more previously created relations (X=xi)⇔(Y=yj)] in the technology. If there are, then algorithm 2100 goes back and iterates until there are no more relations in the tree to be updated.

Data Mining Technology

FIG. 22 represents one way to implement a data mining algorithm as in steps 130-132 (FIG. 1). More detail is incorporated herein by reference to Adjaoute '592, and especially that relating to its FIG. 22. Here the data mining algorithm and the data tree of step 131 are highly advantaged by having been trained by the enriched data 124. Such results in far superior training compared to conventional training with data like raw data 106.

Data mining identifies several otherwise hidden data relationships, including: (1) associations, wherein one event is correlated to another event such as purchase of gourmet cooking books close to the holiday season; (2) sequences, wherein one event leads to another later event such as purchase of gourmet cooking books followed by the purchase of gourmet food ingredients; (3) classification, and, e.g., the recognition of patterns and a resulting new organization of data such as profiles of customers who make purchases of gourmet cooking books; (4) clustering, e.g., finding and visualizing groups of facts not previously known; and (5) forecasting, e.g., discovering patterns in the data that can lead to predictions about the future.

One goal of data mining technology is to create a decision tree based on records in a training database to facilitate and speed up the case-based reasoning technology. The case-based reasoning technology determines if a given input record associated with an electronic transaction is similar to any typical records encountered in a training table. Each record is referred to as a "case". If no similar cases are found, a warning is issued to flag the input record. The data mining technology creates a decision tree as an indexing mechanism for the case-based reasoning technology. Data mining technology can also be used to automatically create and maintain business rules for a rule-based reasoning technology.

The decision tree is an "N-ary" tree, wherein each node contains a subset of similar records in a training database. (An N-ary tree is a tree in which each node has no more than N children.) In preferred embodiments, the decision tree is a binary tree. Each subset is split into two other subsets, based on the result of an intersection between the set of records in the subset and a test on a field. For symbolic fields, the test is if the values of the fields in the records in the subset are equal, and for numeric fields, the test is if the values of the fields in the records in the subset are smaller than a given value. Applying the test on a subset splits the subset in two others, depending on if they satisfy the test or not. The newly created subsets become the children of the subset they originated from in the tree. The data mining technology creates the subsets recursively until each subset that is a terminal node in the tree represents a unique output class.

FIG. 22 is a flowchart of an algorithm 2200 for generating the data mining technology to create a decision tree based on similar records in a training table. Sets "S", R, and U are initialized. Set "S" is a set that contains all the records in a training table, set R is the root of the decision tree, and set U is the set of nodes in the tree that are not terminal nodes. Both R and U are initialized to contain all the records in a training table. Next, a first node Ni (containing all the records in the training database) is removed from U. The triplet (field,test,value) that best splits the subset Si associated with the node Ni into two subsets is determined. The triplet that best splits the subset Si is the one that creates the smallest depth tree possible, that is, the triplet would either create one or two terminal nodes, or create two nodes that, when split, would result in a lower number of children nodes than other triplets. The triplet is determined by using an impurity function such as Entropy or the Gini index to find the information conveyed by each field value in the database. The field value that conveys the least degree of information contains the least uncertainty and determines the triplet to be used for splitting the subsets.

A node Nij is created and associated to the first subset Sij formed. The node Nij is then linked to node Ni, and named with the triplet (field,test,value). Next, a check is performed to evaluate if all the records in subset Sij at node Nij belong to the same output class $c_{ij}$. If they do, then the prediction of node Nij is set to $c_{ij}$. If not, then node Nij is added to U. The algorithm then proceeds to check if there are still subsets Sij to be split in the tree, and if so, the algorithm goes back. When all subsets have been associated with nodes, the algorithm continues for the remaining nodes in U until U is determined to be empty.

Figure 23:
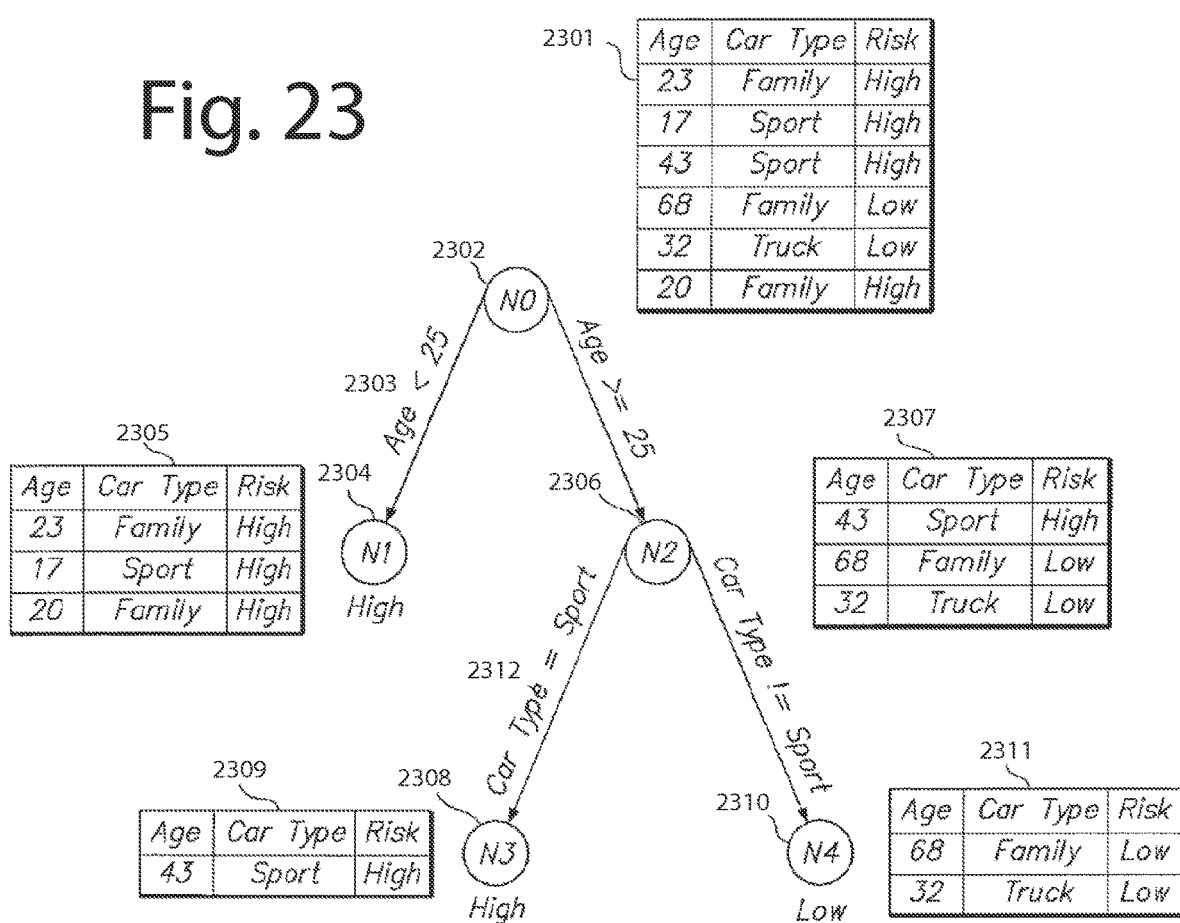

FIG. 23 represents a decision tree 2300 in an example for a database 2301 maintained by an insurance company to predict a risk of an insurance contract based on a type of a car and an age of its driver. Database 2301 has three fields: (1) age, (2) car type, and (3) risk. The risk field is the output class that needs to be predicted for any new incoming data record. The age and the car type fields are used as inputs. The data mining technology builds a decision tree, e.g., one that can ease a search of cases in case-based reasoning to determine if an incoming transaction fits any profiles of similar cases existing in its database. The decision tree starts with a root node N0 (2302). Once the data records in database 2301 are analyzed, a test 2303 is determined that best splits database 2301 into two nodes, a node N1 (2304) with a subset 2305, and a node N2 (2306) with a subset 2307. Node N1 (2304) is a terminal node type, since all data records in subset 2305 have the same class output that indicates a high insurance risk for drivers that are younger than twenty-five.

The data mining technology then splits a node N2 (2306) into two additional nodes, a node N3 (2308) containing a subset 2309, and a node N4 (2310) containing a subset 2311. Both nodes N3 (2308) and N4 (2310) were split from node N2 (2306) based on a test 2312, that checks if the car type is a sports car. As a result, nodes N3 (2308) and N4 (2310) are terminal nodes, with node N3 (2308) signifying a high insurance risk and node N4 (2310) representing a low insurance risk.

The decision tree formed by the data mining technology is preferably a depth two binary tree, significantly reducing the size of the search problem for the case-based reasoning technology. Instead of searching for similar cases to an incoming data record associated with an electronic transaction in the entire database, the case-based reasoning technology only has to use the predefined index specified by the decision tree.

Case-Based Reasoning Technology

The case-based reasoning technology stores past data records or cases to identify and classify a new case. It reasons by analogy and classification. Case-based reasoning technologies create a list of generic cases that best represent the cases in its training table. A typical case is generated by computing similarities between all the cases in its training table and selecting those cases that best represent distinct cases. Whenever a new case is presented in a record, a decision tree is to determine if any input record it has on file in its database is similar to something encountered in its training table.

Figure 24:
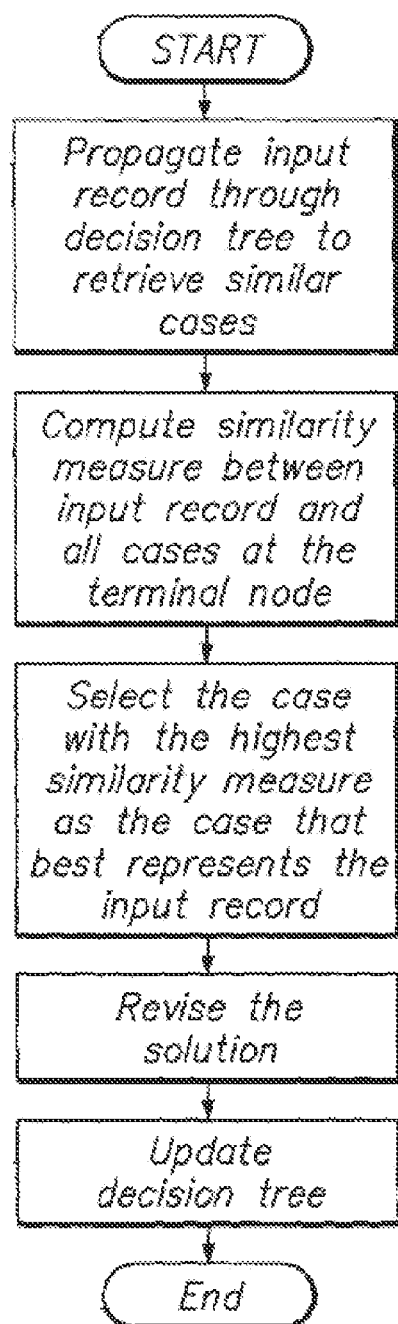

FIG. 24 is a flowchart of an algorithm for generating a case-based reasoning technology used later to find a record in a database that best resembles an input record corresponding to a new transaction. An input record is propagated through a decision tree according to tests defined for each node in the tree until it reaches a terminal node. If an input record is not fully defined, that is, the input record does not contain values assigned to certain fields, and then the input record is propagated to a last node in a tree that satisfies all the tests. The cases retrieved from this node are all the cases belonging to the node's leaves.

A similarity measure is computed between the input record and each one of the cases retrieved. The similarity measure returns a value that indicates how close the input record is to a given case retrieved. The case with the highest similarity measure is then selected as the case that best represents the input record. The solution is revised by using a function specified by the user to modify any weights assigned to fields in the database. Finally, the input record is included in the training database and the decision tree is updated for learning new patterns.

FIG. 25 represents a table 2500 of global similarity measures useful by case-based reasoning technology. The table lists an example of six similarity measures that could be used in case-based reasoning to compute a similarity between cases. The Global Similarity Measure is a computation of the similarity between case values $V_{1i}$ and $V_{2i}$ and are based on local similarity measures sim, for each field $y_i$. The global similarity measures may also employ weights $w_i$ for different fields.

FIG. 26 is an example table of Local Similarity Measures useful in case-based reasoning. Table 2600 lists fourteen different Local Similarity Measures that is used by the global similarity measures listed. The local similarity measures depend on the field type and valuation. The field type is: (1) symbolic or nominal; (2) ordinal, when the values are ordered; (3) taxonomic, when the values follow a hierarchy; and (4) numeric, which can take discrete or continuous values. The Local Similarity Measures are based on a number of parameters, including: (1) the values of a given field for two cases, $V_1$ and $V_2$; (2) the lower ($V_1-$ and $V_2-$) and higher ($V_1+$ and $V_2+$) limits of $V_1$ and $V_2$; (3) the set of all values that is reached by the field; (4) the central points of $V_1$ and $V_2$, V1c and V2c; (5) the absolute value "ec" of a given interval; and (6) the height "h" of a level in a taxonomic descriptor.

Genetic Algorithms Technology

Genetic algorithms technologies include a library of genetic algorithms that incorporate biological evolution concepts to find if a class is true, e.g., a business transaction is fraudulent, there is network intrusion, etc. Genetic algorithms is used to analyze many data records and predictions generated by other predictive technologies and recommend its own efficient strategies for quickly reaching a decision.

Rule-Based Reasoning, Fuzzy Logic, and Constraint Programming Technologies

Rule-based reasoning, fuzzy logic, and constraint programming technologies include business rules, constraints, and fuzzy rules to determine the output class of a current data record, e.g., if an electronic transaction is fraudulent. Such business rules, constraints, and fuzzy rules are derived from past data records in a training database or created from predictable but unusual data records that may arise in the future. The business rules is automatically created by the data mining technology, or they is specified by a user. The fuzzy rules are derived from business rules, with constraints specified by a user that specify which combinations of values for fields in a database are allowed and which are not.

Figure 27:
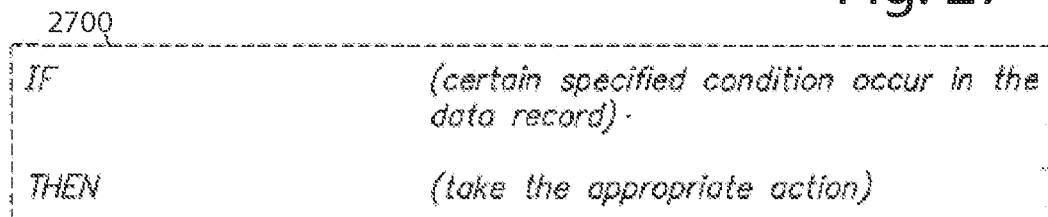

FIG. 27 represents a rule 2700 for use with the rule-based reasoning technology. Rule 2700 is an IF-THEN rule containing an antecedent and consequence. The antecedent uses tests or conditions on data records to analyze them. The consequence describes the actions to be taken if the data satisfies the tests. An example of rule 2700 that determines if a credit card transaction is fraudulent for a credit card belonging to a single user may include "IF (credit card user makes a purchase at 8 AM in New York City) and (credit card user makes a purchase at 8 AM in Atlanta) THEN (credit card number may have been stolen)". The use of the words "may have been" in the consequence sets a trigger that other rules need to be checked to determine if the credit card transaction is indeed fraudulent or not.

Figure 28:
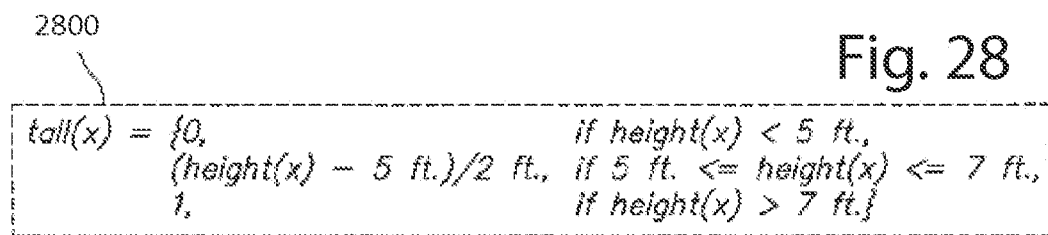

FIG. 28 represents a fuzzy rule 2800 to specify if a person is tall. Fuzzy rule 2800 uses fuzzy logic to handle the concept of partial truth, e.g., truth values between "completely true" and "completely false" for a person who may or may not be considered tall. Fuzzy rule 2800 contains a middle ground, in addition to the binary patterns of yes/no. Fuzzy rule 2800 derives here from an example rule such as "IF height>6 ft., THEN person is tall".

Fuzzy logic derives fuzzy rules by "fuzzification" of the antecedents and "de-fuzzification" of the consequences of business rules.

Figure 29:
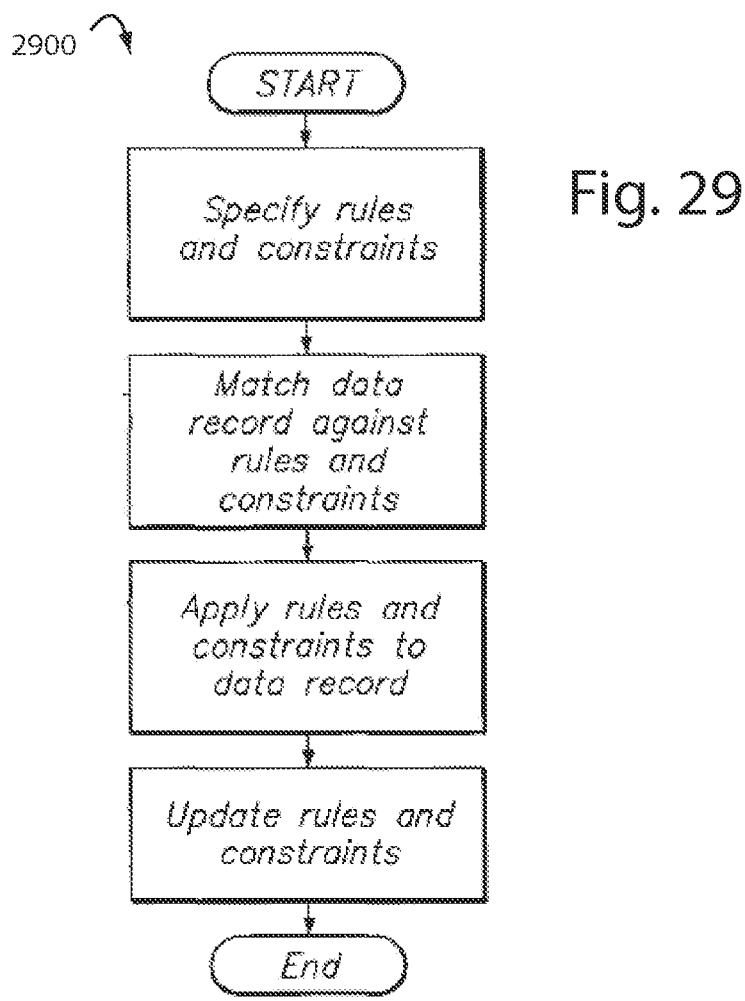

FIG. 29 is a flowchart of an algorithm 2900 for applying rule-based reasoning, fuzzy logic, and constraint programming to determine if an electronic transaction is fraudulent.

The rules and constraints are specified by a user-service consumer and/or derived by data mining technology. The data record associated with a current electronic transaction is matched against the rules and the constraints to determine which rules and constraints apply to the data. The data is tested against the rules and constraints to determine if the transaction is fraudulent. The rules and constraints are updated to reflect the new electronic transaction.

The present inventor, Dr. Akli Adjaoute and his Company, Brighterion, Inc. (San Francisco, Calif.), have been highly successful in developing fraud detection computer models and applications for banks, payment processors, and other financial institutions. In particular, these fraud detection computer models and applications are trained to follow and develop an understanding of the normal transaction behavior of single individual accountholders. Such training is sourced from multi-channel transaction training data or single-channel. Once trained, the fraud detection computer models and applications are highly effective when used in real-time transaction fraud detection that comes from the same channels used in training.

Some embodiments of the present invention train several single-channel fraud detection computer models and applications with corresponding different channel training data. The resulting, differently trained fraud detection computer models and applications are run several in parallel so each can view a mix of incoming real-time transaction message reports flowing in from broad diverse sources from their unique perspectives. One may compute a "hit" the others will miss, and that's the point.

If one differently trained fraud detection computer model and application produces a hit, it is considered herein a warning that the accountholder has been compromised or has gone rogue. The other differently trained fraud detection computer models and applications should be and are sensitized to expect fraudulent activity from this accountholder in the other payment transaction channels. Hits across all channels are added up and too many is reason to shut down all payment channels for the affected accountholder.

In general, a method for cross-channel financial fraud protection comprises training a variety of real-time, risk-scoring fraud model technologies with training data selected for each from a common transaction history. This then can specialize each member in the monitoring of a selected channel. After training, the heterogeneous real-time, risk-scoring fraud model technologies are arranged in parallel so that all receive the same mixed channel flow of real-time transaction data or authorization requests.

Parallel, diversity trained, real-time, risk-scoring fraud model technologies are hosted on a network server platform for real-time risk scoring of a mixed channel flow of real-time transaction data or authorization requests. Risk thresholds are directly updated for particular accountholders in every member of the parallel arrangement of diversity trained real-time, risk-scoring fraud model technologies when any one of them detects a suspicious or outright fraudulent transaction data or authorization request for the accountholder. So, a compromise, takeover, or suspicious activity of an accountholder's account in any one channel is thereafter prevented from being employed to perpetrate a fraud in any of the other channels.

Such method for cross-channel financial fraud protection can further include building a population of real-time, long-term, and recursive profiles for each accountholder in each of the real-time, risk-scoring fraud model technologies. Then during real-time use, maintaining and updating the real-time, long-term, and recursive profiles for each accountholder in each and all of the real-time, risk-scoring fraud model technologies with newly arriving data.

If during real-time use a compromise, takeover, or suspicious activity of the accountholder's account in any one channel is detected, then updating the real-time, long-term, and recursive profiles for each accountholder in each and all of the other real-time, risk-scoring fraud model technologies to further include an elevated risk flag. The elevated risk flags are included in a final risk score calculation 728 for the current transaction or authorization request.

Fifteen-minute vectors are a way to cross pollenate risks calculated in one channel with the others. The 15-minute vectors can represent an amalgamation or fuzzification of transactions in all channels, or channel-by channel. Once a 15-minute vector has aged, it is shifted into a 100-minute vector, a one-hour vector, and a whole day vector by a simple shift register means. These vectors represent velocity counts that is very effective in catching fraud as it is occurring in real time.

In every case, embodiments of the present invention include adaptive learning that combines three learning techniques to evolve the artificial intelligence classifiers. First is the automatic creation of profiles, or smart-agents, from historical data, e.g., long-term profiling. The second is real-time learning, e.g., enrichment of the smart-agents based on real-time activities. The third is adaptive learning carried by incremental learning algorithms.

For example, two years of historical credit card transactions data needed over twenty seven terabytes of database storage. A smart-agent is created for each individual card in that data in a first learning step, e.g., long-term profiling. Each profile is created from the card's activities and transactions that took place over the two year period. Each profile for each smart-agent comprises knowledge extracted field-by-field, such as merchant category code (MCC), time, amount for an mcc over a period of time, recursive profiling, zip codes, type of merchant, monthly aggregation, activity during the week, weekend, holidays, Card not present (CNP) versus card present (CP), domestic versus cross-border, etc. this profile will highlights all the normal activities of the smart-agent (specific payment).

Smart-agent technology learns specific behaviors of each customer and creates a smart-agent to follow the behavior of each customer. Because it learns from each activity of a customer, the smart-agent updates its profiles and makes effective changes at runtime. It is the only technology with an ability to identify and stop, in real-time, previously unknown fraud schemes. It has the highest detection rate and lowest false positives because it separately follows and learns the behaviors of each customer.

Smart-agents have a further advantage in data size reduction. Once, say twenty-seven terabytes of historical data is transformed into smart-agents, only 200-gigabytes is needed to represent twenty-seven million distinct smart-agents corresponding to all the distinct customers.

Incremental learning technologies are embedded in the machine algorithms and smart-agent technology to continually re-train from any false positives and negatives that occur along the way. Each corrects itself to avoid repeating the same classification errors. Data mining logic incrementally changes the decision trees by creating a new link or updating the existing links and weights. Neural networks update the weight matrix, and case based reasoning logic updates generic cases or creates new ones. Smart-agents update their profiles by adjusting the normal/abnormal thresholds, or by creating exceptions.

Figure 30:
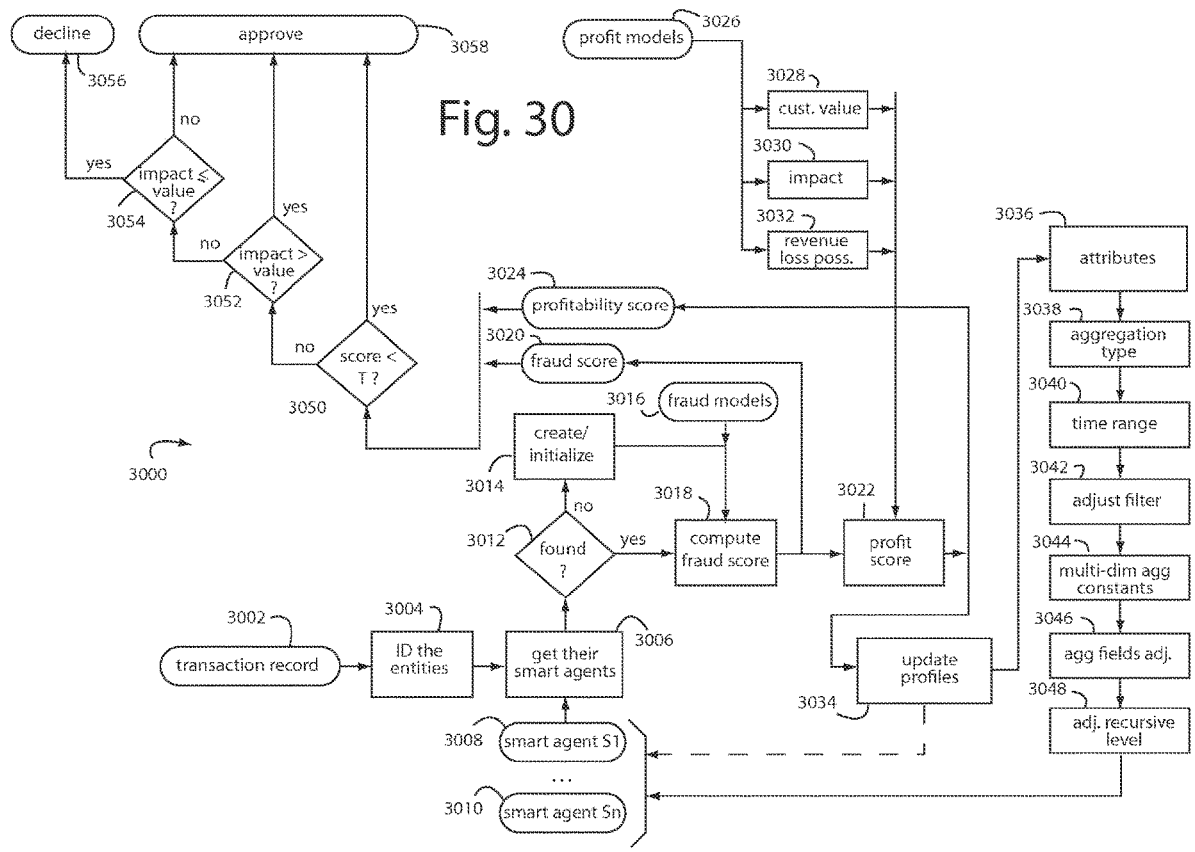
FIG. 30 is a flowchart of an algorithm for deciding between approving or declining a business transaction record based on a customer's individual demonstrated value in past transactions and the projected loss in revenues that would occur in the future if this customer became alienated.

FIG. 30 illustrates a decision engine algorithm 3000 that leverages our smart agent technology to maintain independent decision thresholds for each represented entity, e.g., payment customers represented in transaction records 3002 that arrive in the millions at a secure central network server requesting authorization for some purchase. For example in the MASTERCARD System. A step 3004 identifies the entity active in each record 3002 by an attribute in a field in one of many fields in the records. Or by device identification, or behavior identification. A step 3006 checks to see if the entity so identified is presently represented by a smart agent 3008 . . . 3010.

A step 3012 asks if a matching smart agent was found for the entity just identified. If not, a step 3014 creates and initializes a smart agent and adds it to the pool of smart agents 3008 . . . 3010. A step 3016 provides fraud models that are used in a step 3018 to compute a fraud score for this one single transaction with the one single entity using profiles in memory storage private to the one matching smart agent 3008 . . . 3010. Such scores are not an authorization decision. Decisions consider a computation from profit scoring step 3022 that produces a profitability score 3024. A plurality of business profit models 3026 includes a determination of this particular entity's customer value 3028, a determination of the impact on their historic transaction levels 3030, and a determination of what the revenue loss to the company would be if they lost this particular customer 3032. These sub-computations all figure into the profitability score 3024 produced by profit scoring step 3022.

The new information now available is used by a step 3034 to update the profiles in memory storage attached to the respective smart agents 3008 . . . 3010. In detail this involves a step 3036 for the dynamic creation, removal, and update of discrete attributes of the smart agents based on the new context in the instant records. And a step 3038 adjusts the aggregation type appropriate for each attribute in each data field of the record: count, sum, distinct, ratio, average, minimum, maximum, standard deviation, etc. A step 3040 adjusts the time range, e.g., the starting and ending times. A step 3042 adjusts any filters based on any reduced number of fields surviving step 3036. A step 3044 adjusts any multi-dimensional aggregation constraints. A step 3046 adjusts any aggregation fields if needed. A step 3048 adjusts the recursive levels.

The fraud score 3020 and the profitability score 3024 are used as individualized thresholds in a step 3050 to see if the fraud score alone indicates the transaction appears genuine (T). If not, a step 3052 tests to see if the impact of declining this customer in this transaction in record 3002 exceeds the value. If not, a step 3054 tests to see if the impact is less than or equal to the value. If yes, then it is best, from a business profitability perspective to issue a transaction declined decision 3056. In all other cases, it is best, again from that same business profitability perspective to issue a transaction approved decision 3058.

My United States Patent Application AUTHORIZATION DATA PROCESSING SYSTEM FOR OPTIMIZING PROFITS OTHERWISE LOST IN FALSE POSITIVES, Ser. No. 14/690,380, filed Apr. 18, 2015, is related and is therefore incorporated by reference herein. That and this Application differ from conventional methods that consider only risk, not business profits. The present method is therefore a decision maker, nor a fraud scorer.

The decision engine algorithm 3000 is not used in modeling, e.g., FIGS. 1-5B. It would, however find appropriate use in decision engine 650 (FIG. 6), step 708 (FIG. 7), method 800 (FIG. 8), and method 900 (FIG. 9). Method 900 is good in a wide range of applications, e.g., to classify fraud/no-fraud in payment transaction networks, to predict buy/sell/hold in stock trading, to detect malicious insider activity, and to call for preventative maintenance with machine and device failure predictions. The decision engine algorithm 3000 could be adapted to fit each of these applications.

Figure 31:
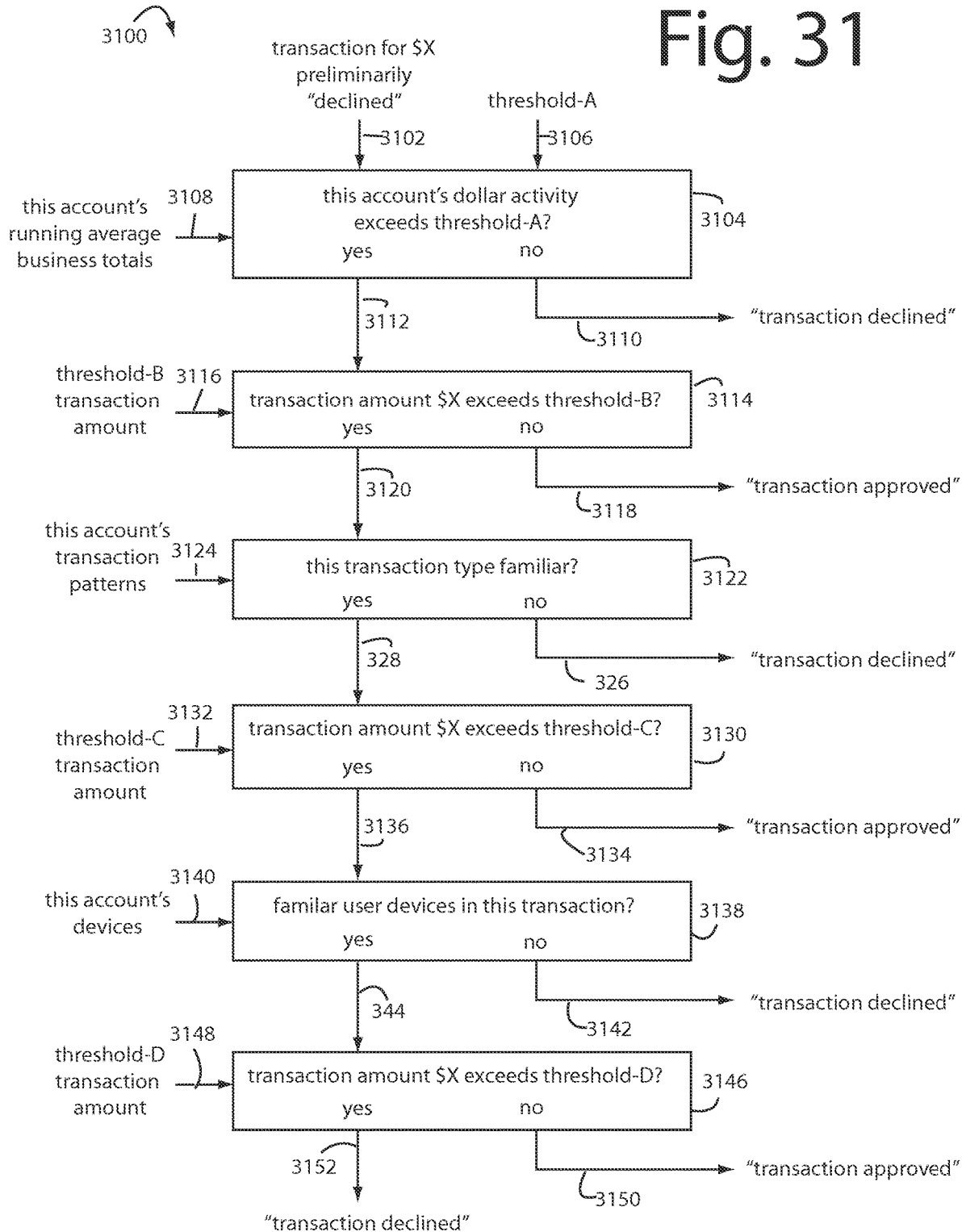
FIG. 31 is a flowchart diagram illustrating an algorithm for deciding if a transaction for a particular amount $X that has already been preliminarily "declined" according to some other scoring model should be overruled in light of business profitability considerations.

FIG. 31 shows how steps 3052 and 3054 can be further enhanced by including more considerations, e.g., familiar device, familiar location, familiar shopping pattern, etc.

FIG. 31 represents a method 3100 for when a payment transaction for a particular transaction amount $X has already been preliminarily "declined" and included in a decision 3102 according to some fraud scoring model. A test 3104 compares a dollar transaction "threshold amount-A" 3106 to a computation 3108 of the running average business this particular user has been doing with this account involved. The thinking here is that valuable customers who do more than an average amount (threshold-A 3106) of business with their payment should not be so easily or trivially declined. Some artificial intelligence deliberation is appropriate.

If, however test 3104 decides that the accountholder has not earned special processing, a "transaction declined" decision 3110 is issued as final (transaction-declined). Such is then forwarded by the financial network to the merchant POS.

But when test 3104 decides that the accountholder has earned special processing, a transaction-preliminarily-approved decision 3112 is carried forward to a test 3114. A threshold-B transaction amount 3116 is compared to the transaction amount $X. Essentially, threshold-B transaction amount 3116 is set at a level that would relieve qualified accountholders of ever being denied a petty transaction, e.g., under $250, and yet not involve a great amount of risk should the "positive" scoring indication from the "other scoring model" not prove much later to be "false". If the transaction amount $X is less than threshold-B transaction amount 3116, a "transaction approved" decision 3118 is issued as final. Such is then forwarded by the financial network to the merchant point-of-sale.

If the transaction amount $X is more than threshold-B transaction amount 3116, a transaction-preliminarily-approved decision 3120 is carried forward to a familiar transaction pattern test 3122. An abstract 3124 of this account's transaction patterns is compared to the instant transaction. For example, if this accountholder seems to be a new parent with a new baby as evidenced in purchases of particular items, then all future purchases that could be associated are reasonably predictable. Or, in another example, if the accountholder seems to be on business in a foreign country as evidenced in purchases of particular items and travel arrangements, then all future purchases that could be reasonably associated are to be expected and scored as lower risk. And, in one more example, if the accountholder seems to be a professional gambler as evidenced in cash advances at casinos, purchases of specific things and arrangements, then these future purchases too could be reasonably associated are be expected and scored as lower risk.

So if the transaction type is not a familiar one, then a "transaction declined" decision 3126 is issued as final. Such is then forwarded by the financial network to the merchant point-of-sale. Otherwise, a transaction-preliminarily-approved decision 3128 is carried forward to a threshold-C test 3130.

A threshold-C transaction amount 3132 is compared to the transaction amount $X. Essentially, threshold-C transaction amount 3132 is set at a level that would relieve qualified accountholders of being denied a moderate transaction, e.g., under $2500, and yet not involve a great amount of risk because the accountholder's transactional behavior is within their individual norms. If the transaction amount $X is less than threshold-C transaction amount 3132, a "transaction approved" decision 3134 is issued as final. Such is then forwarded by the financial network to the merchant point-of-sale.

If the transaction amount $X is more than threshold-C transaction amount 3132, a transaction-preliminarily-approved decision 3136 is carried forward to a familiar user device recognition test 3138. An abstract 3140 of this account's user devices is compared to those used in the instant transaction.

So if the user device is not recognizable as one employed by the accountholder, then a "transaction declined" decision 3142 is issued as final. Such is then forwarded by the financial network to the merchant point-of-sale. Otherwise, a transaction-preliminarily-approved decision 3144 is carried forward to a threshold-D test 3146.

A threshold-D transaction amount 3148 is compared to the transaction amount $X. Basically, the threshold-D transaction amount 3148 is set at a higher level that would avoid denying substantial transactions to qualified accountholders, e.g., under $10,000, and yet not involve a great amount of risk because the accountholder's user devices are recognized and their instant transactional behavior is within their individual norms. If the transaction amount $X is less than threshold-D transaction amount 3132, a "transaction approved" decision 3150 is issued as final. Such is then forwarded by the financial network to the merchant point-of-sale.

Otherwise, the transaction amount $X is just too large to override a denial if the other scoring model decision 3102 was "positive", e.g., for fraud, or some other reason. In such case, a "transaction declined" decision 3152 is issued as final. Such is then forwarded by the financial network to the merchant point-of-sale.

In general, threshold-B 3116 is less than threshold-C 3132, which in turn is less than threshold-D 3148. It could be that tests 3122 and 3138 would serve profits better if swapped in FIG. 31. Embodiments of the present invention would therefore include this variation as well. It would seen that threshold-A 3106 should be empirically derived and driven by business goals.

The further data processing required by method 3100 occurs in real-time while merchant point-of-sale and users 124, 126, and 128 wait for approved/declined data messages 112 to arrive through financial network. The consequence of this is that the abstracts for this-account's-running-average-totals 3108, this account's-transaction-patterns 3124, and this-account's-devices 3140 must all be accessible and on-hand very quickly. A simple look-up is preferred to having to compute the values. The smart agents and the behavioral profiles they maintain and that we've described in this Application and those we incorporate herein by reference are up to doing this job well. Conventional methods and apparatus may struggle to provide this information. Our USPTO Ser. No. 14/675,453, filed, 311 Mar. 2015, and titled, Behavioral Device Identifications Of User Devices Visiting Websites, describes a few ways to gather and have on-hand abstracts for this-account's-devices 3140.

It may not be immediately obvious that the best customers using payments generate the most transactions by far. The larger-than-average number of transactions that can be associated with these better customers means the smart agent profile modeling and smart agent profiles in run-time will be better and more accurate for each of them. This reduces uncertainty for these good customers.

Although particular embodiments of the present invention have been described and illustrated, such is not intended to limit the invention. Modifications and changes will no doubt become apparent to those skilled in the art, and it is intended that the invention only be limited by the scope of the appended claims.

The invention claimed is:

1. At least one computer network server for supporting payment authorization services, the at least one server comprising:
one or more processors;
non-transitory computer-readable storage media having computer-executable instructions stored thereon, wherein when executed by the one or more processors the computer-readable instructions cause the one or more processors to—
receive transaction data corresponding to a plurality of transactions associated with a plurality of transactional entities;
compute a fraud score for each of the plurality of transactions at least in part by—
inputting transaction data of the transaction to a classification model and a smart agent associated with the corresponding transactional entity to generate a first output from the smart agent and a second output from the classification model, the smart agent comprising a representation of historical data of the corresponding transactional entity and the classification model being constructed according to one or more of: data mining logic, a neural network, case-based-reasoning, clustering, fuzzy logic, a genetic algorithm, a decision tree, and business rules,
analyzing the first output and the second output to generate the fraud score for the transaction;
compute a profitability score for each of the plurality of transactional entities;
determine that the fraud score corresponding to an increased risk transaction of the plurality of transactions exceeds a first threshold representing an increased likelihood of fraud;
determine that the profitability score of a profitable transaction entity of the plurality of transactional entities exceeds a second threshold representing increased profitability; and
based on the determinations of increased likelihood of fraud and increased profitability for the profitable transaction entity, issue a transaction approval message.

2. The at least one computer network server of claim 1, wherein generating the first output for each of the plurality of transactions includes comparing contents of at least one data field of the transaction data against a profile of the smart agent associated with the transactional entity corresponding to the transaction.

3. The at least one computer network server of claim 1, wherein analyzing the first output and the second output is performed at least in part by retrieving one or more client tuning inputs and incorporating the one or more client tuning inputs into the weighted summation.

4. The at least one computer network server of claim 1, wherein, for each of the transactional entities—
generating the profitability score includes: (a) computing a customer value for the transactional entity, (b) determining an impact on historical transaction levels of the transactional entity, (c) determining a revenue loss assuming cessation of future transactions by the transactional entity,
  making the profitability determination includes determining that the profitability score entitles the transactional entity to special processing.

5. The at least one computer network server of claim 1, wherein the computer-readable instructions further instruct the one or more processors to, for each of the plurality of transactions, update the smart agent corresponding to the transactional entity of the transaction according to the transaction data of the transaction.

6. The at least one computer network server of claim 1, wherein issuing the transaction approval message for the increased risk transaction is contingent on—
  determining that the profitability score entitles the transactional entity to special processing,
  determining that a transaction amount of the increased risk transaction is above a third threshold.

7. The at least one computer network server of claim 6, wherein issuing the transaction approval message for the increased risk transaction is additionally contingent on requiring, based on the transaction amount exceeding the third threshold, the transaction data of the increased risk transaction to satisfy a familiar transaction pattern test.

8. Non-transitory computer-readable storage media having computer-executable instructions for supporting payment authorization services, wherein when executed by at least one processor the computer-readable instructions cause the at least one processor to:
  receive transaction data corresponding to a plurality of transactions associated with a plurality of transactional entities;
  compute a fraud score for each of the plurality of transactions at least in part by—
    inputting transaction data of the transaction to a classification model and a smart agent associated with the corresponding transactional entity to generate a first output from the smart agent and a second output from the classification model, the smart agent comprising a representation of historical data of the corresponding transactional entity and the classification model being constructed according to one or more of: data mining logic, a neural network, case-based-reasoning, clustering, fuzzy logic, a genetic algorithm, a decision tree, and business rules,
    analyzing the first output and the second output to generate the fraud score for the transaction;
  compute a profitability score for each of the plurality of transactional entities;
  determine that the fraud score corresponding to an increased risk transaction of the plurality of transactions exceeds a first threshold representing an increased likelihood of fraud;
  determine that the profitability score of a profitable transaction entity of the plurality of transactional entities exceeds a second threshold representing increased profitability; and
  based on the determinations of increased likelihood of fraud and increased profitability for the profitable transaction entity, issue a transaction approval message.

9. The non-transitory computer-readable storage media of claim 8, wherein generating the first output for each of the plurality of transactions includes comparing contents of at least one data field of the transaction data against a profile of the smart agent associated with the transactional entity corresponding to the transaction.

10. The non-transitory computer-readable storage media of claim 8, wherein analyzing the first output and the second output at least in part includes retrieving one or more client tuning inputs and incorporating the one or more client tuning inputs into the weighted summation.

11. The non-transitory computer-readable storage media of claim 8, wherein, for each of the transactional entities—
  generating the profitability score includes: (a) computing a customer value for the transactional entity, (b) determining an impact on historical transaction levels of the transactional entity, (c) determining a revenue loss assuming cessation of future transactions by the transactional entity,
  making the profitability determination includes determining that the profitability score entitles the transactional entity to special processing.

12. The non-transitory computer-readable storage media of claim 8, wherein the computer-readable instructions further instruct the at least one processor to, for each of the plurality of transactions, update the smart agent corresponding to the transactional entity of the transaction according to the transaction data of the transaction.

13. The non-transitory computer-readable storage media of claim 8, wherein issuing the transaction approval message for the increased risk transaction is contingent on—
  determining that the profitability score entitles the transactional entity to special processing,
  determining that a transaction amount of the increased risk transaction is above a third threshold.

14. The non-transitory computer-readable storage media of claim 13, wherein issuing the transaction approval message for the increased risk transaction is additionally contingent on requiring, based on the transaction amount exceeding the third threshold, the transaction data of the increased risk transaction to satisfy a familiar transaction pattern test.

15. A computer-implemented method for supporting payment authorization services comprising, via one or more transceivers and/or processors:
  receiving transaction data corresponding to a plurality of transactions associated with a plurality of transactional entities;
  computing a fraud score for each of the plurality of transactions at least in part by—
    inputting transaction data of the transaction to a classification model and a smart agent associated with the corresponding transactional entity to generate a first output from the smart agent and a second output from the classification model, the smart agent comprising a representation of historical data of the corresponding transactional entity and the classification model being constructed according to one or more of: data mining logic, a neural network, case-based-reasoning, clustering, fuzzy logic, a genetic algorithm, a decision tree, and business rules,
    analyzing the first output and the second output to generate the fraud score for the transaction;
  computing a profitability score for each of the plurality of transactional entities;
  determining that the fraud score corresponding to an increased risk transaction of the plurality of transactions exceeds a first threshold representing an increased likelihood of fraud;

determining that the profitability score of a profitable transaction entity of the plurality of transactional entities exceeds a second threshold representing increased profitability; and based on the determinations of increased likelihood of fraud and increased profitability for the profitable transaction entity, issuing a transaction approval message.

16. The computer-implemented method of claim 15, wherein analyzing the first output and the second output at least in part includes retrieving one or more client tuning inputs and incorporating the one or more client tuning inputs into the weighted summation.

17. The computer-implemented method of claim 15, wherein, for each of the transactional entities— generating the profitability score includes: (a) computing a customer value for the transactional entity, (b) determining an impact on historical transaction levels of the transactional entity, (c) determining a revenue loss assuming cessation of future transactions by the transactional entity, making the profitability determination includes determining that the profitability score entitles the transactional entity to special processing.

18. The computer-implemented method of claim 15, further comprising, for each of the plurality of transactions, updating the smart agent corresponding to the transactional entity of the transaction according to the transaction data of the transaction.

19. The computer-implemented method of claim 15, wherein issuing the transaction approval message for the increased risk transaction is contingent on— determining that the profitability score entitles the transactional entity to special processing, determining that a transaction amount of the increased risk transaction is above a third threshold.

20. The computer-implemented method of claim 19, wherein issuing the transaction approval message for the increased risk transaction is additionally contingent on requiring, based on the transaction amount exceeding the third threshold, the transaction data of the increased risk transaction to satisfy a familiar transaction pattern test.

* * * * *